(12) United States Patent
Samsilova

(10) Patent No.: US 9,253,295 B2
(45) Date of Patent: Feb. 2, 2016

(54) SYSTEM FOR MECHANICALLY AND ELECTRICALLY CONNECTING A MOBILE DEVICE CASE TO DIFFERENT MOUNTS

(71) Applicant: Cemal Samsilova, Alexandria, VA (US)

(72) Inventor: Cemal Samsilova, Alexandria, VA (US)

( * ) Notice: Subject to any disclaimer, the term of this patent is extended or adjusted under 35 U.S.C. 154(b) by 0 days.

(21) Appl. No.: 14/598,099

(22) Filed: Jan. 15, 2015

(65) Prior Publication Data

US 2015/0148103 A1    May 28, 2015

Related U.S. Application Data

(63) Continuation of application No. 14/297,471, filed on Jun. 5, 2014.

(60) Provisional application No. 61/908,353, filed on Nov. 25, 2013.

(51) Int. Cl.
*H01R 24/00* (2011.01)
*H04M 1/02* (2006.01)
*H01R 24/76* (2011.01)
*H01R 13/62* (2006.01)

(52) U.S. Cl.
CPC ......... *H04M 1/0274* (2013.01); *H01R 13/6205* (2013.01); *H01R 24/76* (2013.01); *H04M 1/0249* (2013.01); *H04M 1/0262* (2013.01)

(58) Field of Classification Search
CPC ... H01R 13/6205; H01R 24/76; H04M 1/027; H04M 1/0262; H04M 1/0249
USPC ........................................................ 439/626
See application file for complete search history.

(56) References Cited

U.S. PATENT DOCUMENTS

| | | | | |
|---|---|---|---|---|
| 5,052,943 A | * | 10/1991 | Davis ............................ | 439/357 |
| 5,162,719 A | * | 11/1992 | Tomura et al. ................ | 320/110 |
| 5,189,358 A | * | 2/1993 | Tomura et al. ................ | 320/115 |
| 5,317,247 A | * | 5/1994 | Chong et al. .................. | 320/112 |
| 5,518,424 A | * | 5/1996 | Douty et al. ................... | 439/660 |
| 5,746,626 A | * | 5/1998 | Kwiat et al. ................... | 439/630 |
| 7,063,571 B2 | * | 6/2006 | Yu .................................. | 439/630 |
| 7,086,894 B2 | * | 8/2006 | Ebine ............................ | 439/500 |
| 7,183,745 B2 | * | 2/2007 | Kubale et al. ................. | 320/114 |
| 7,443,137 B2 | * | 10/2008 | Scott et al. .................... | 320/114 |
| 8,605,458 B2 | * | 12/2013 | Liu ............................... | 361/810 |

* cited by examiner

*Primary Examiner* — Jean F Duverne
(74) *Attorney, Agent, or Firm* — Symbus Law Group, LLC; Clifford D. Hyra

(57) ABSTRACT

A system, for mechanically and electrically connecting to a mobile device that includes a first connector having an exposed first set of one or more electrodes, including a mount and a case. The case is removably attachable to the mount and can removably receive the mobile device at least partially. The case includes: a second connector, configured to removably engage the first connector, and having an exposed second electrode set corresponding to the first set, respectively; and a first mating part that includes an integral and exposed third electrode set corresponding at least in part to and electrically connected to the second set, respectively. The mount includes a second mating part having an integral and exposed fourth electrode set corresponding to the third set, respectively. The first and the second mating parts are removably engageable and provide mechanical and electrical connections between the case and the mount.

13 Claims, 28 Drawing Sheets

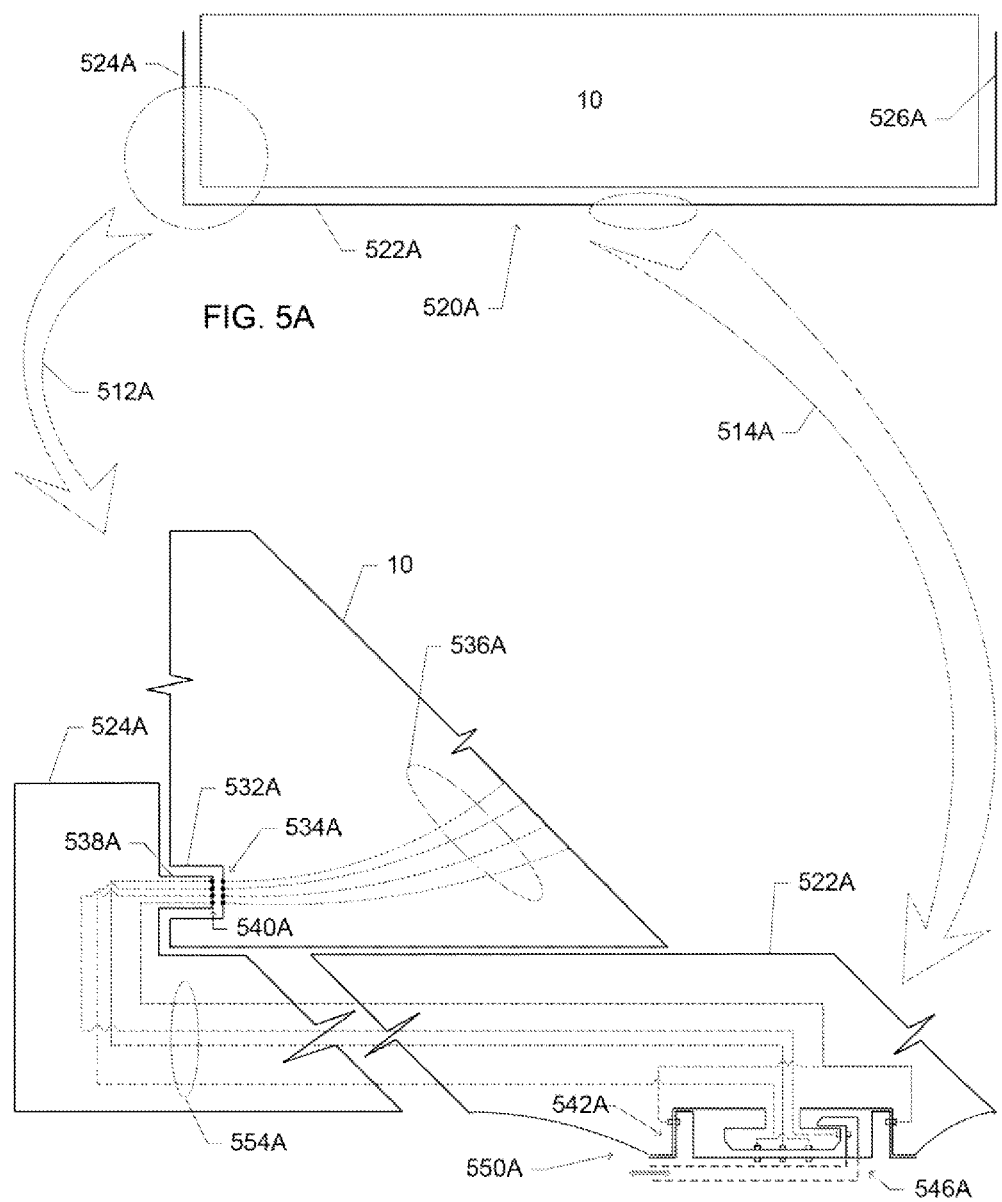

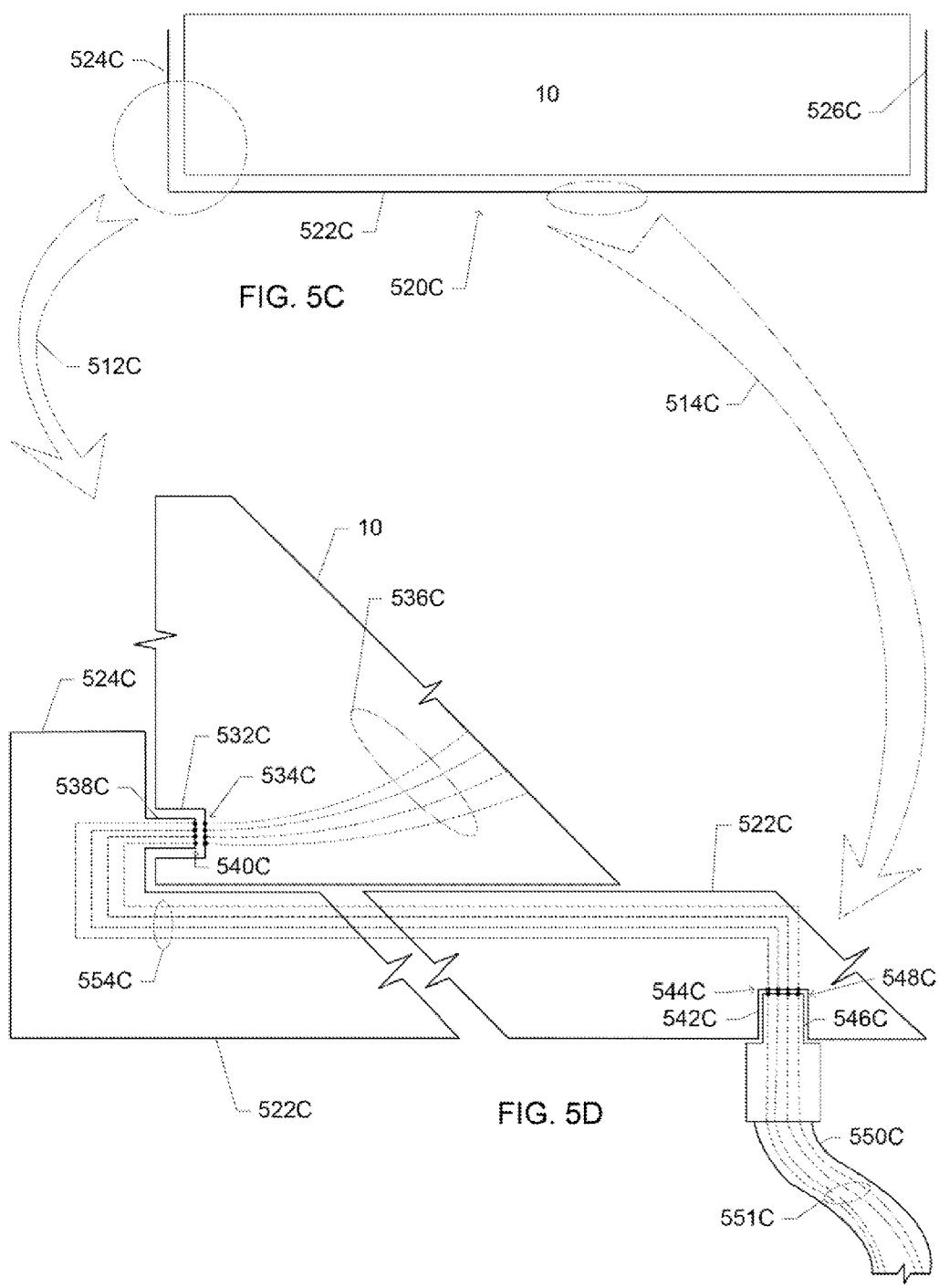

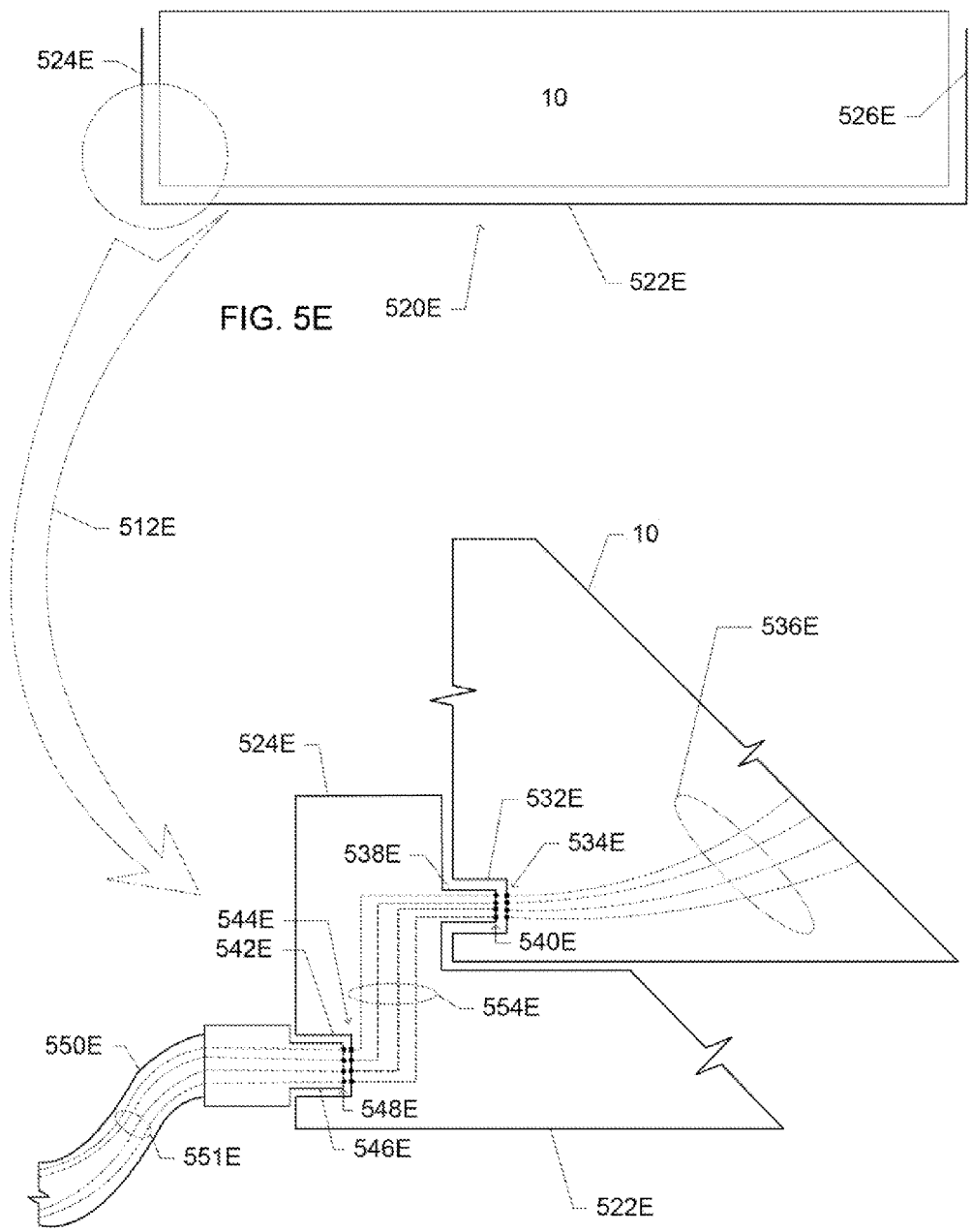

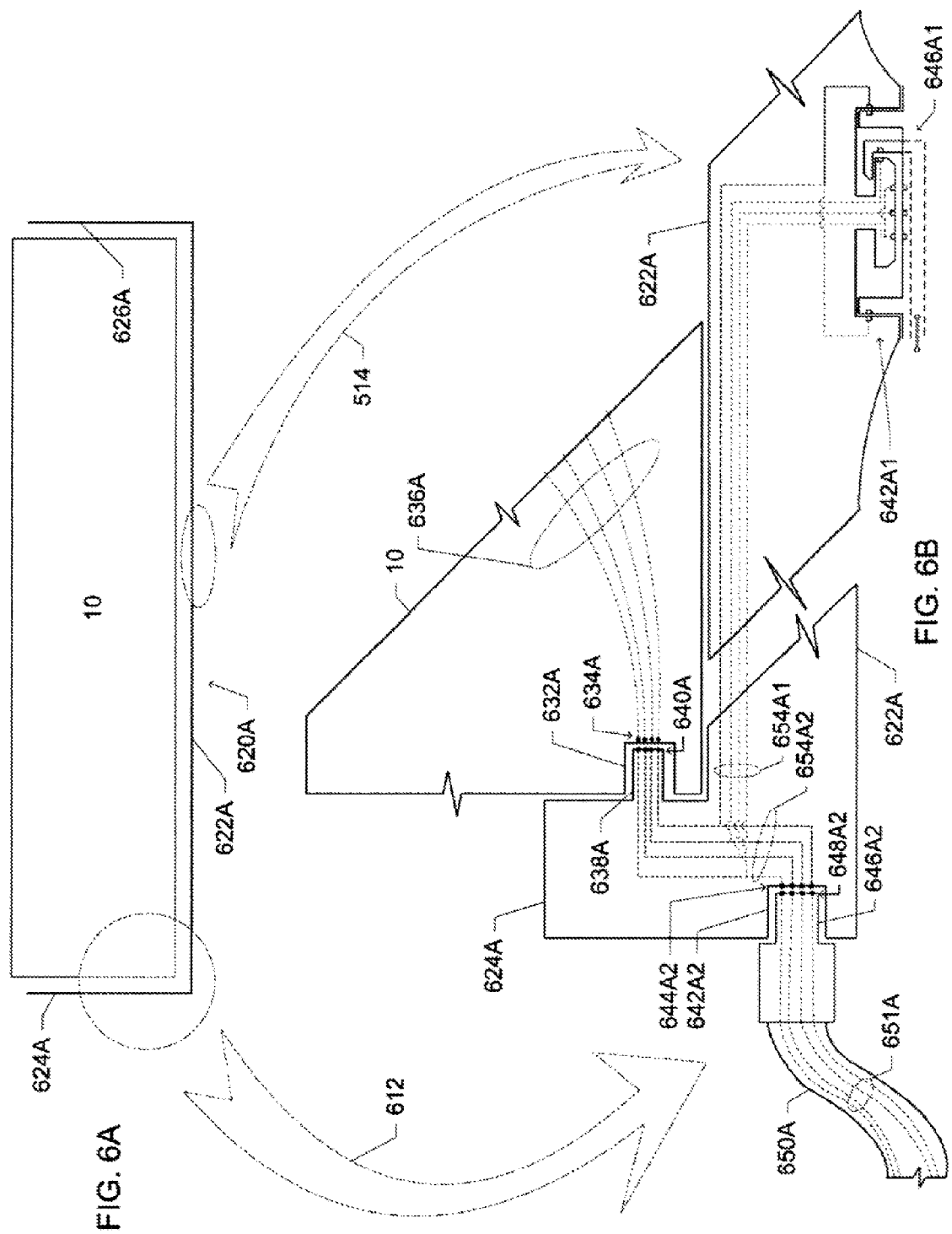

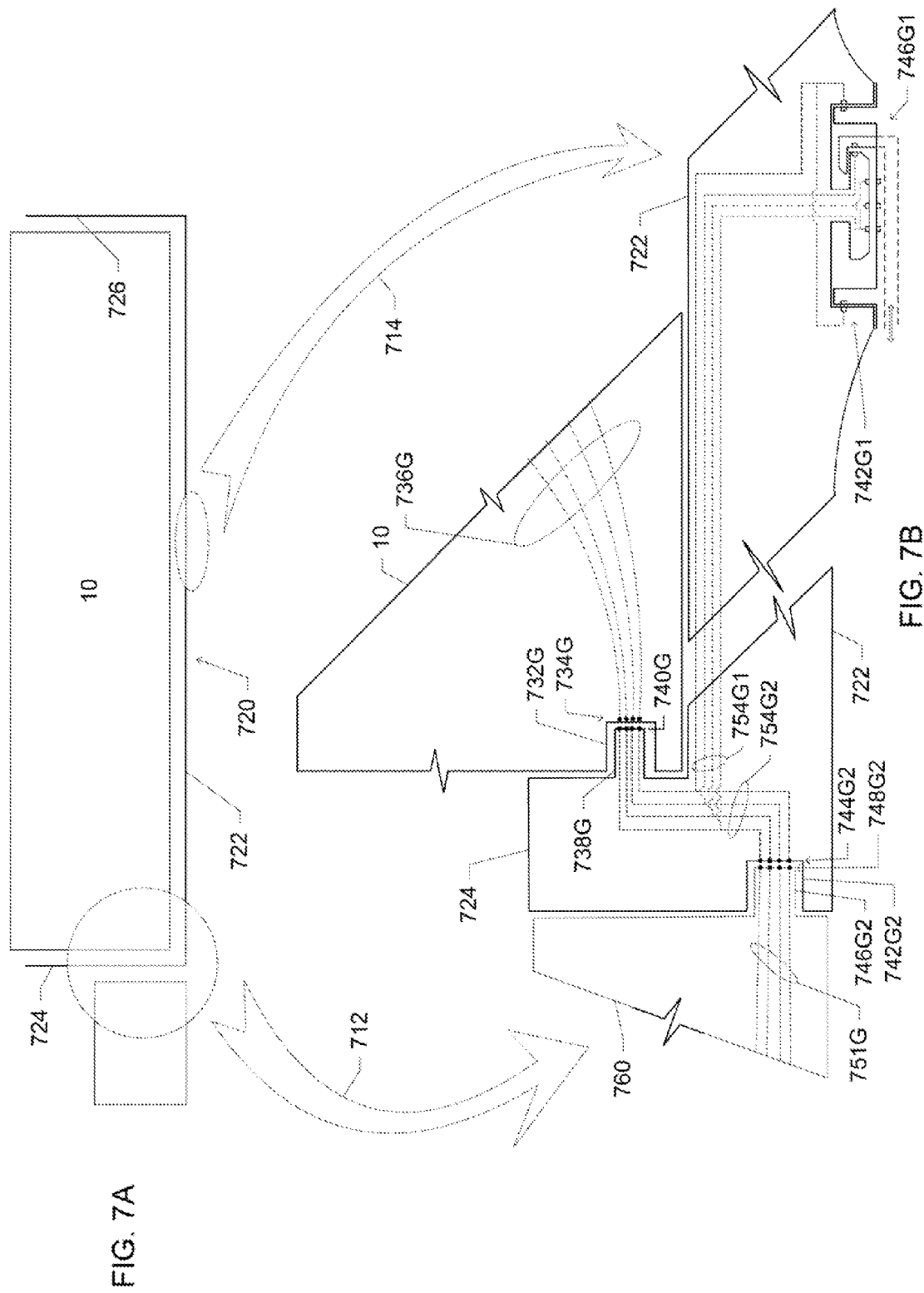

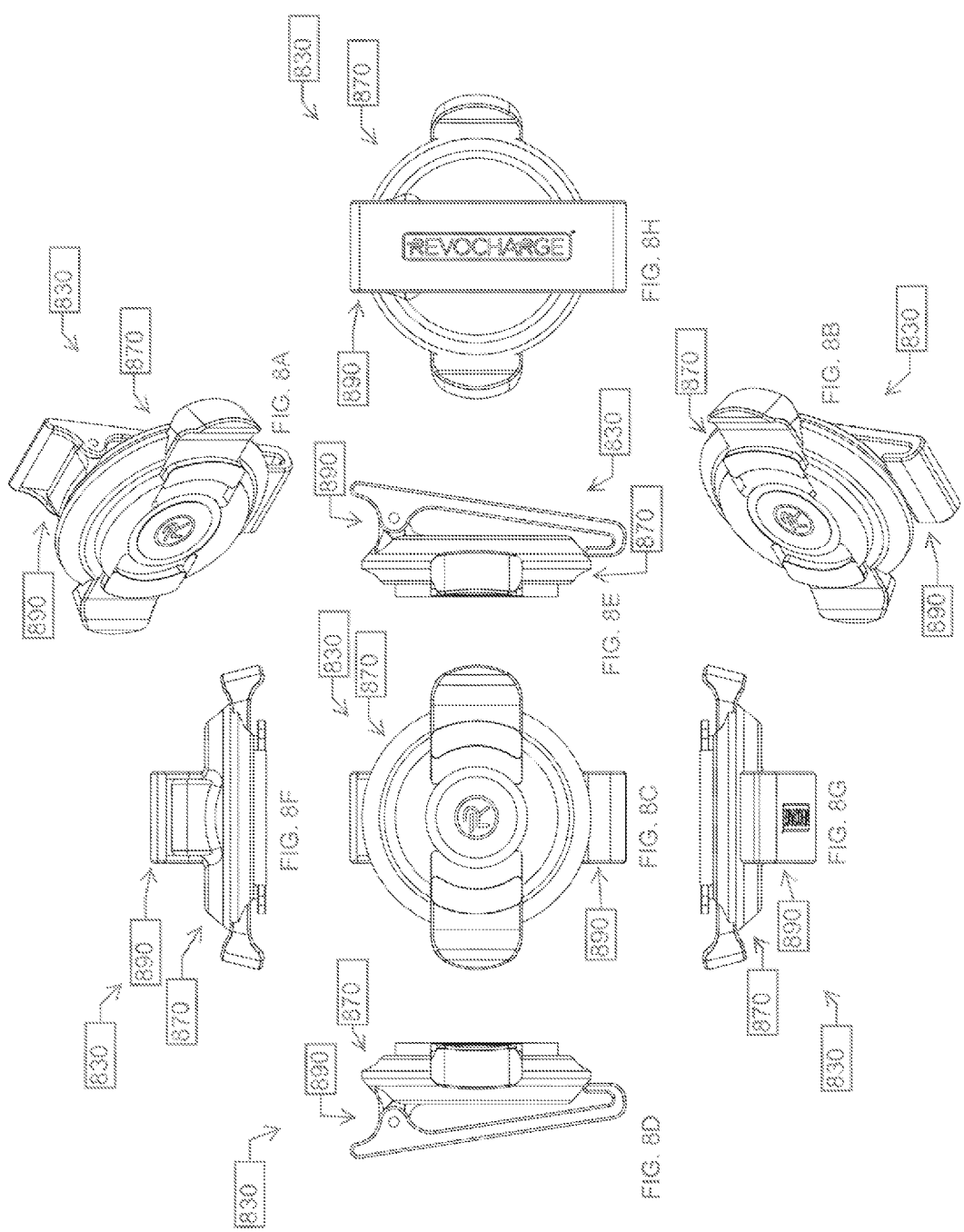

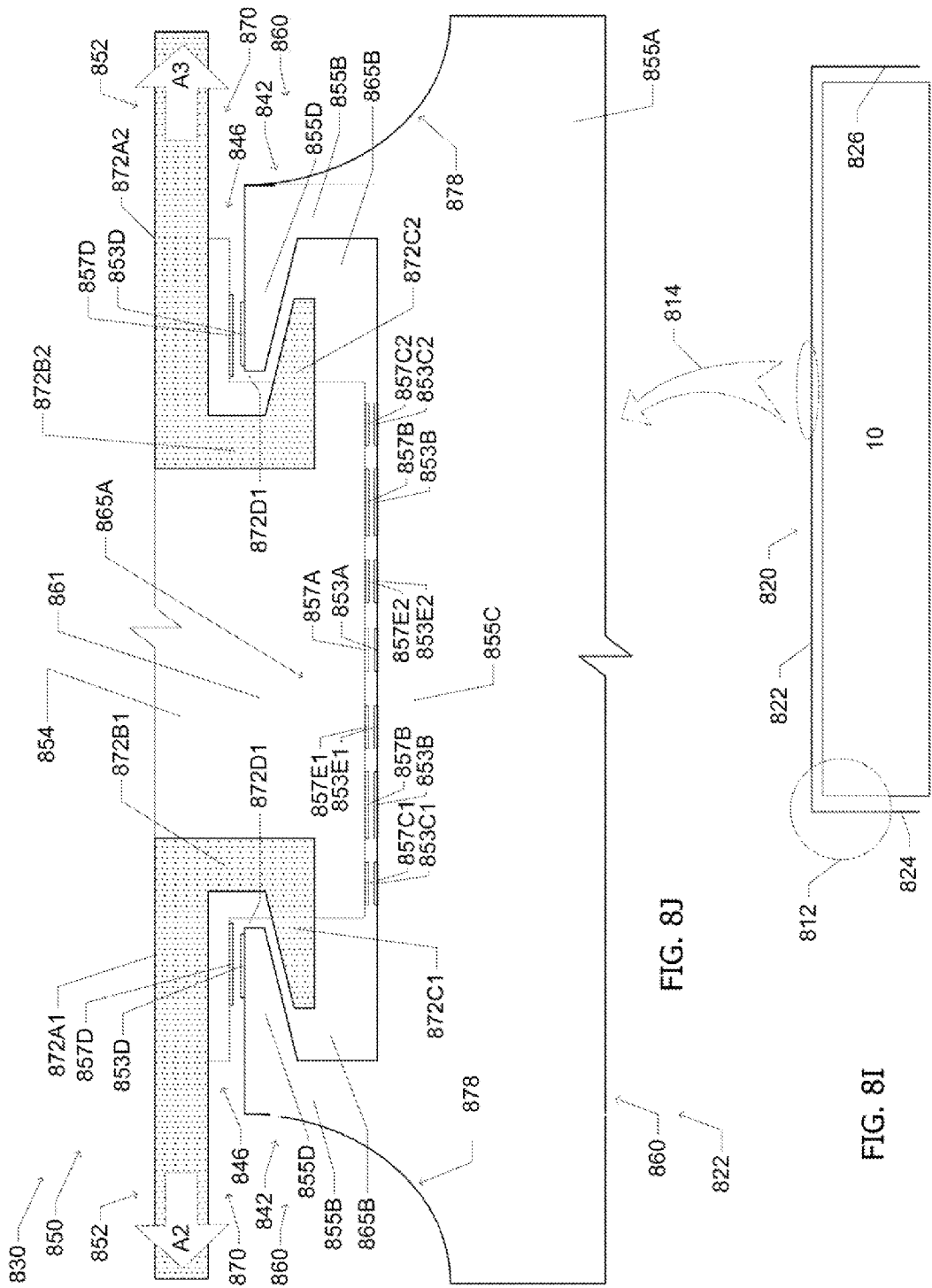

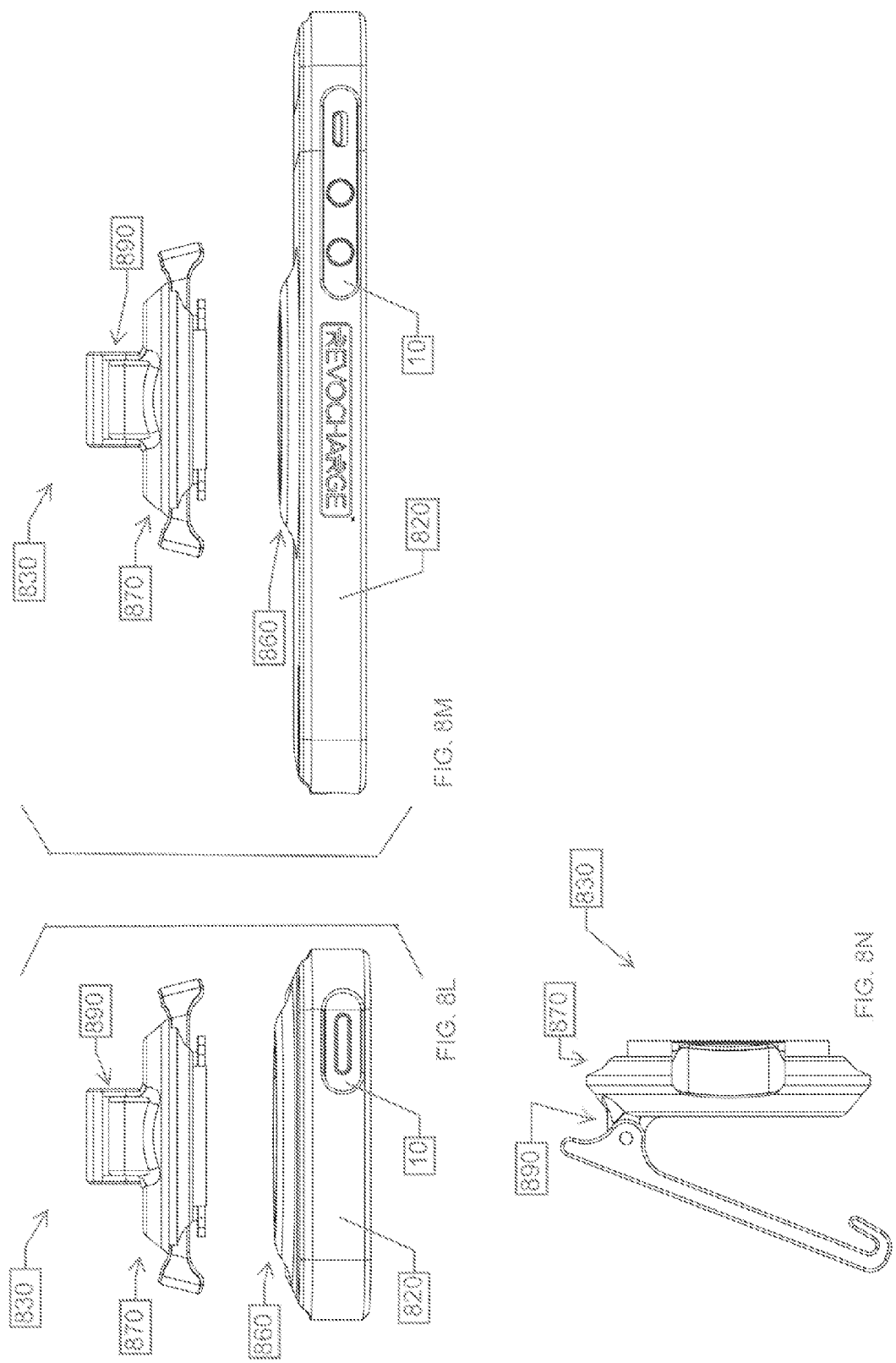

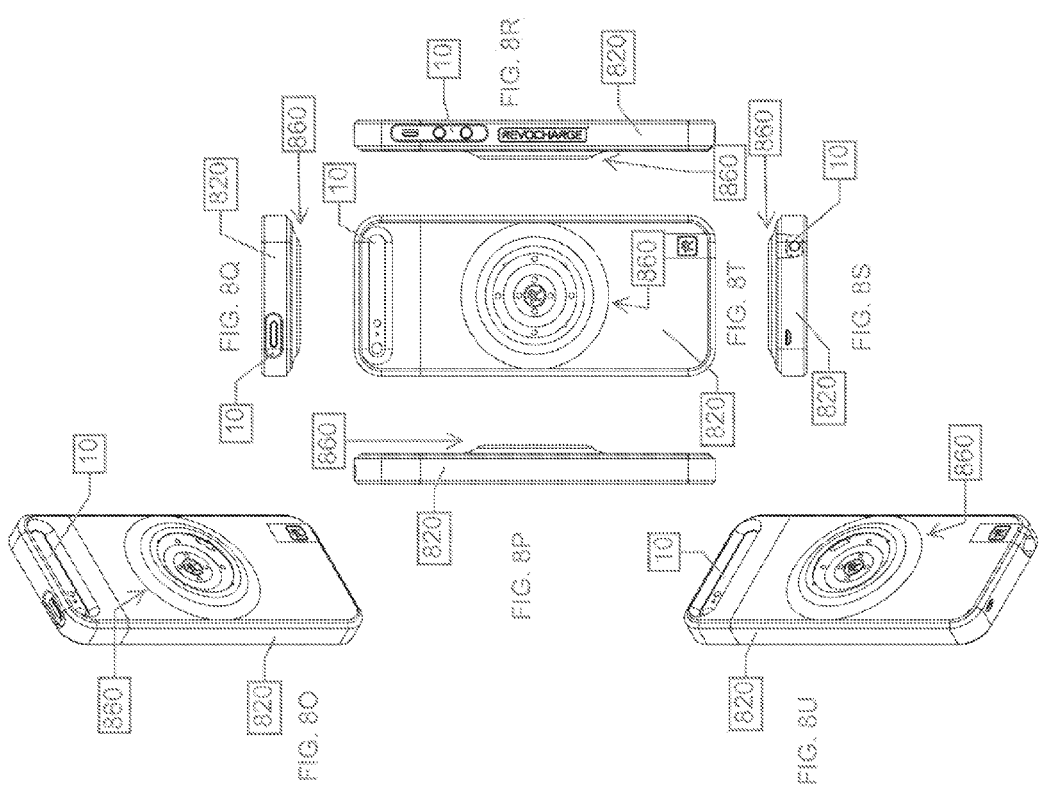

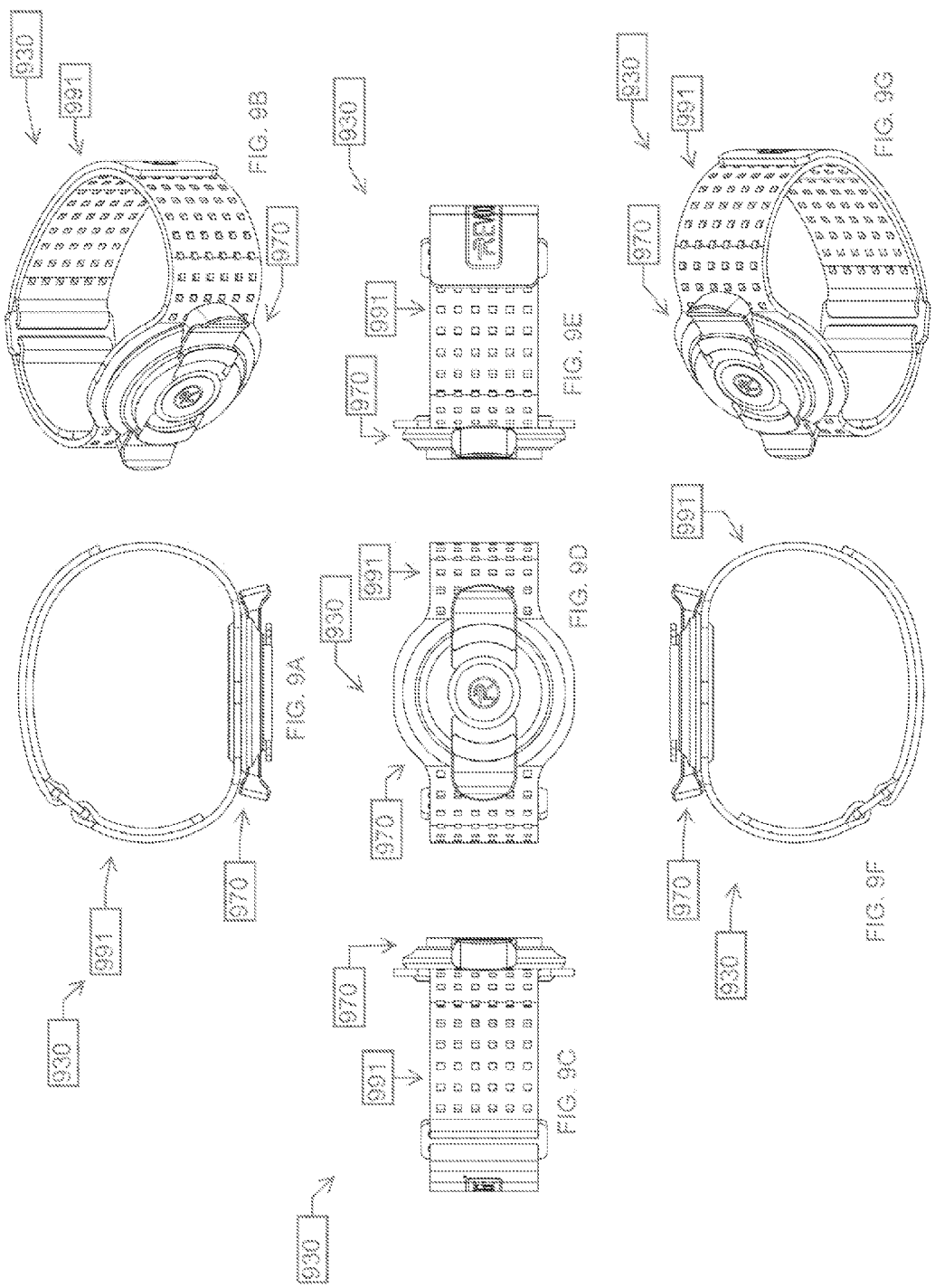

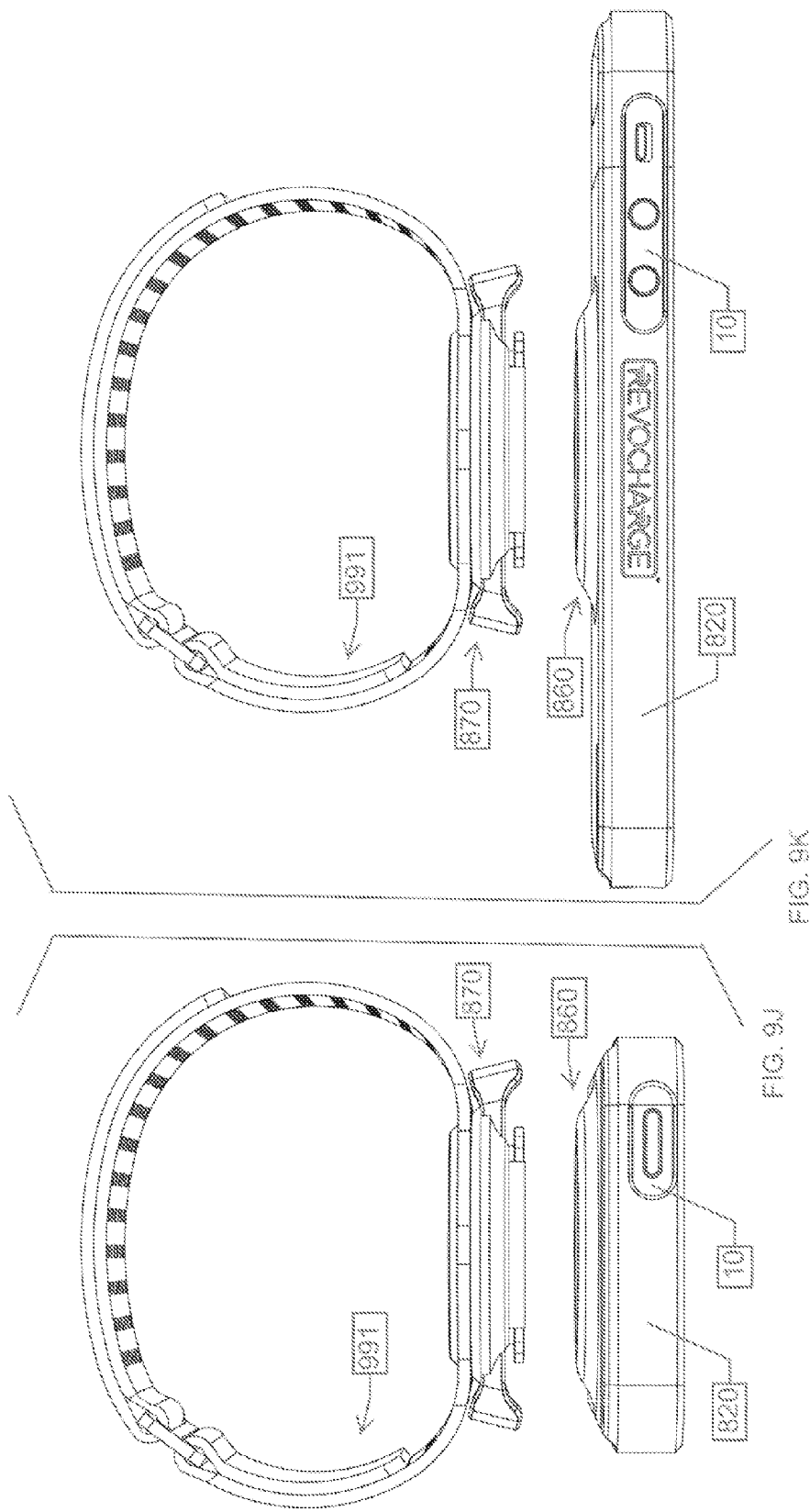

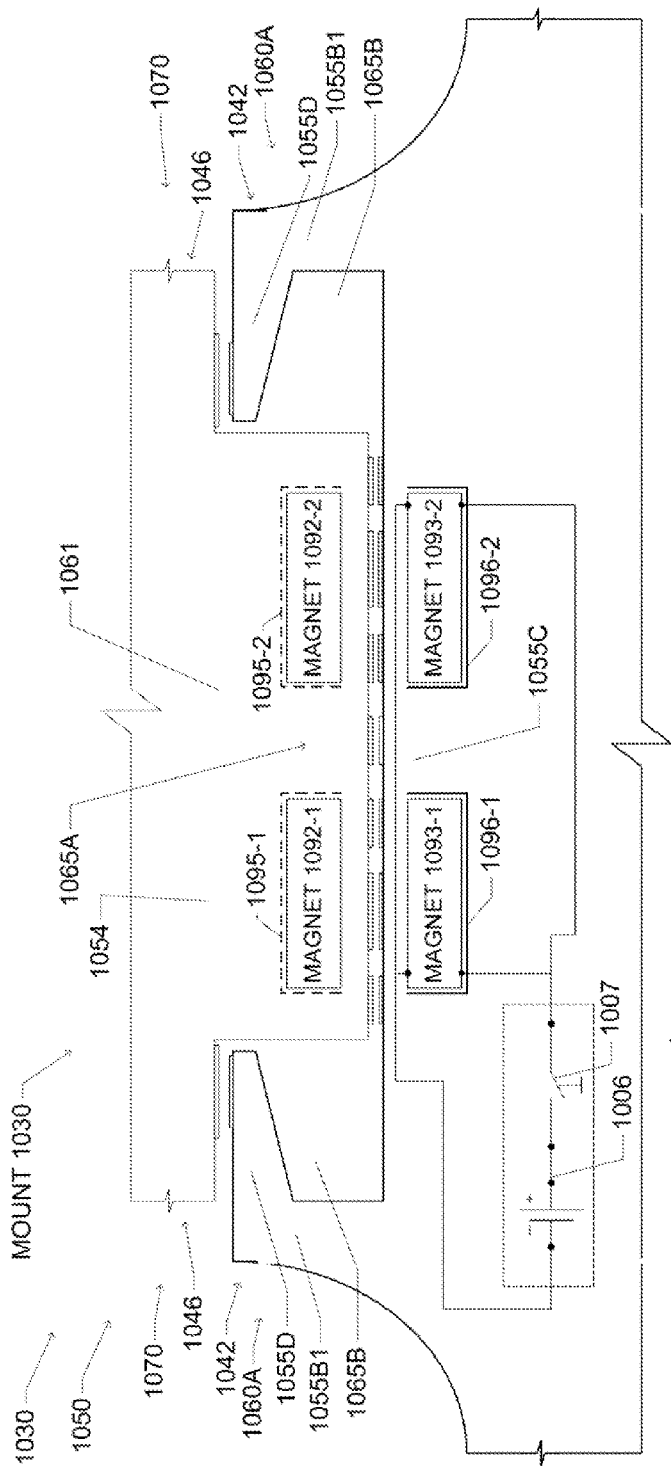
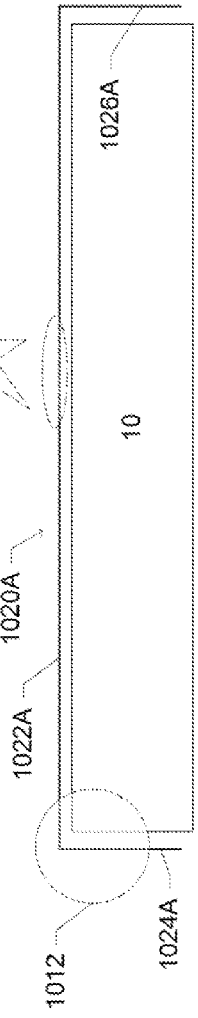
FIG. 10B
FIG. 10A

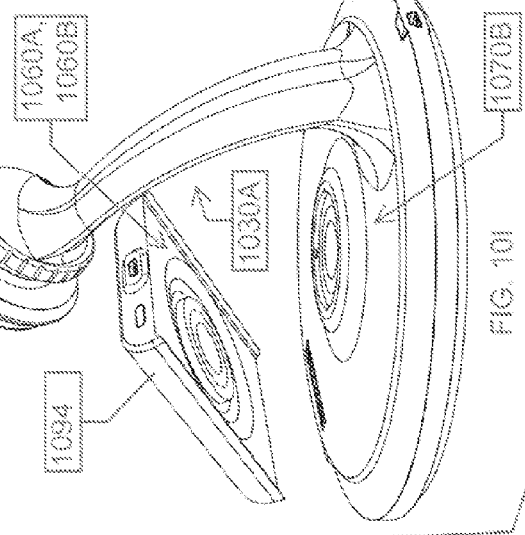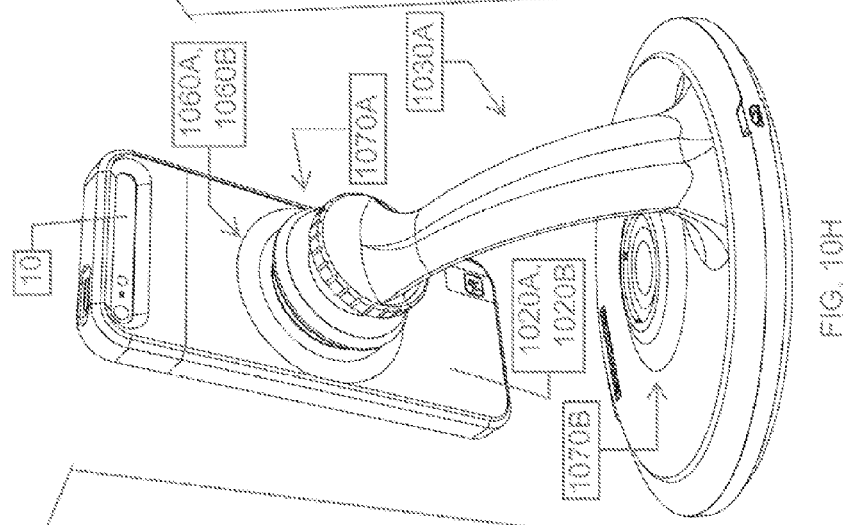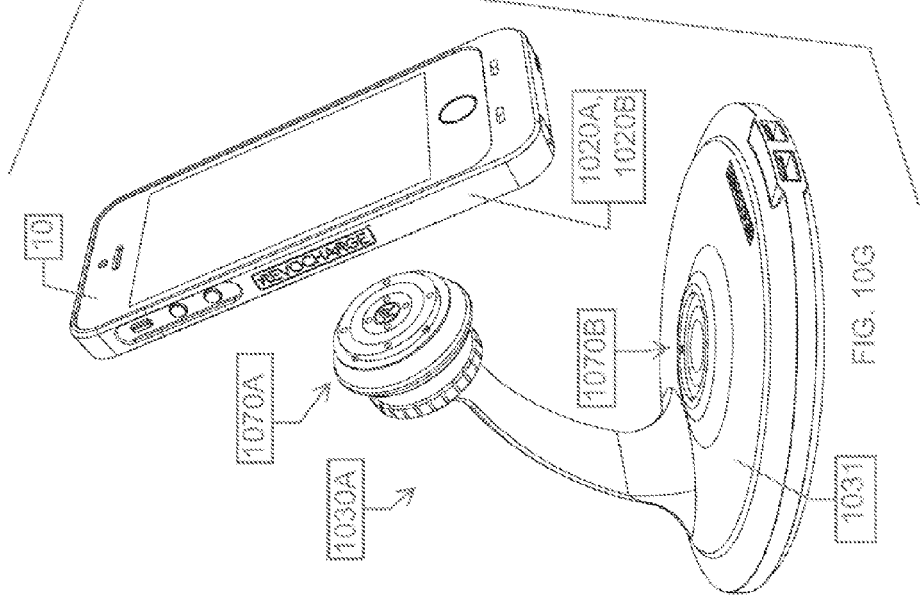

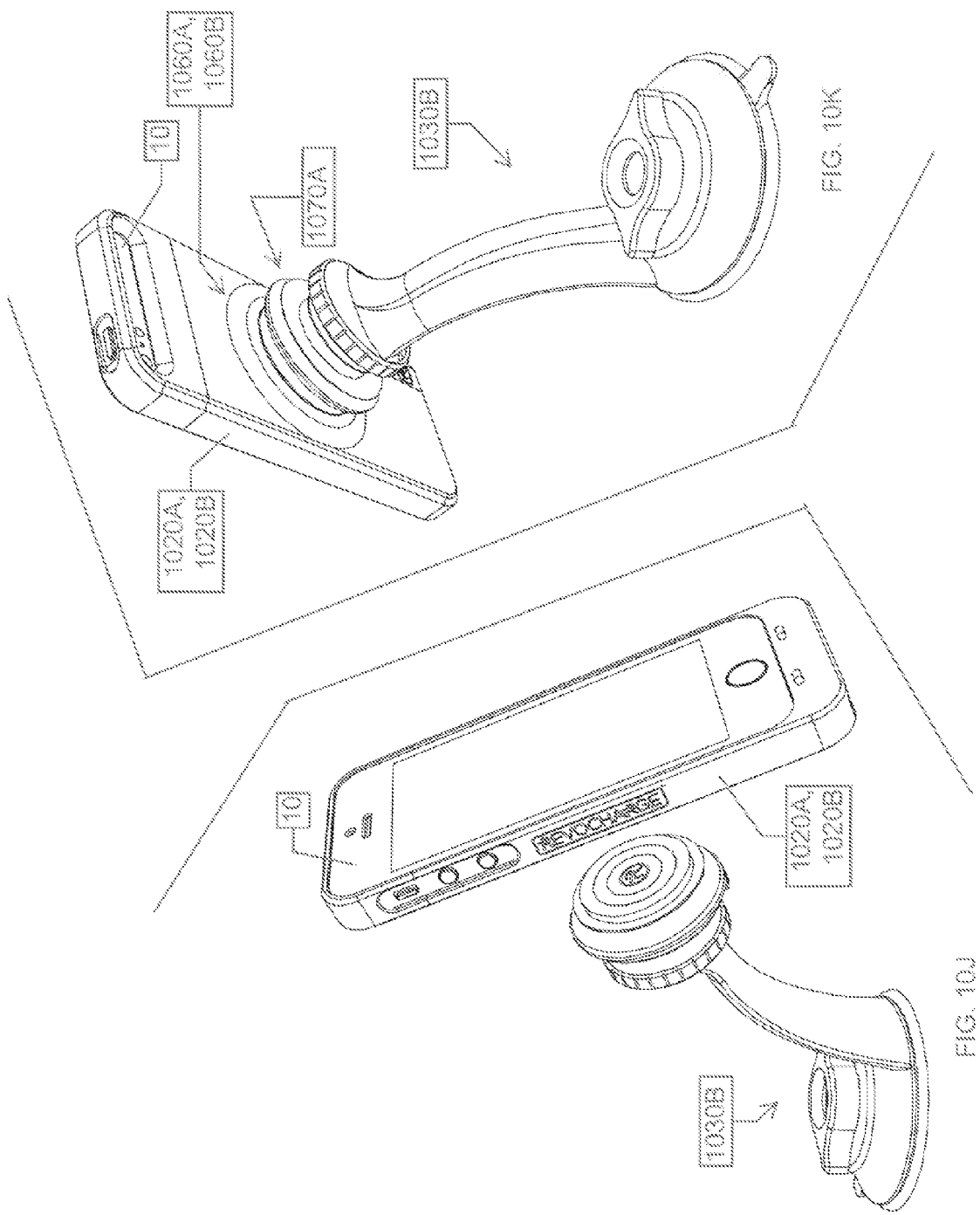

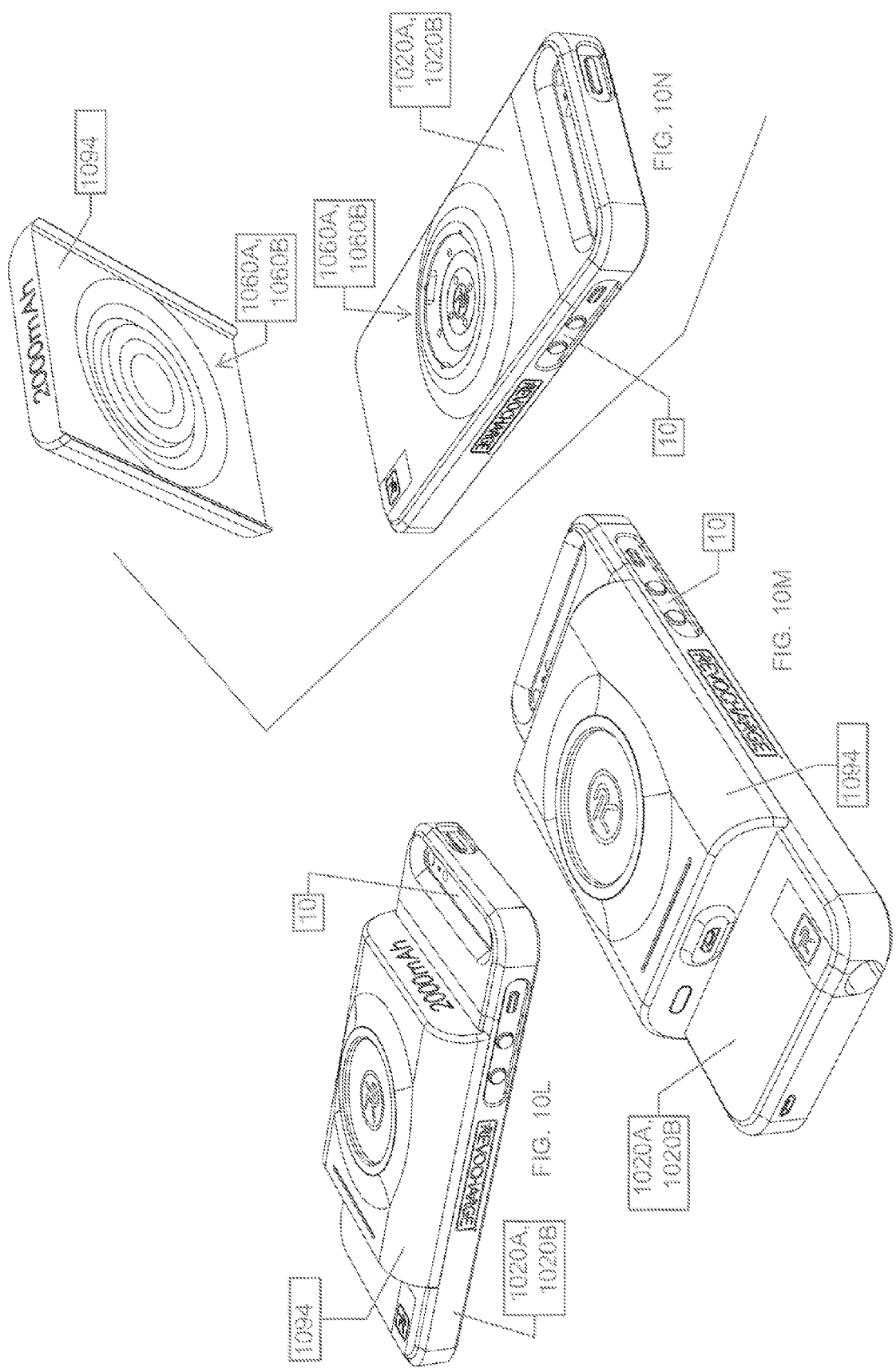

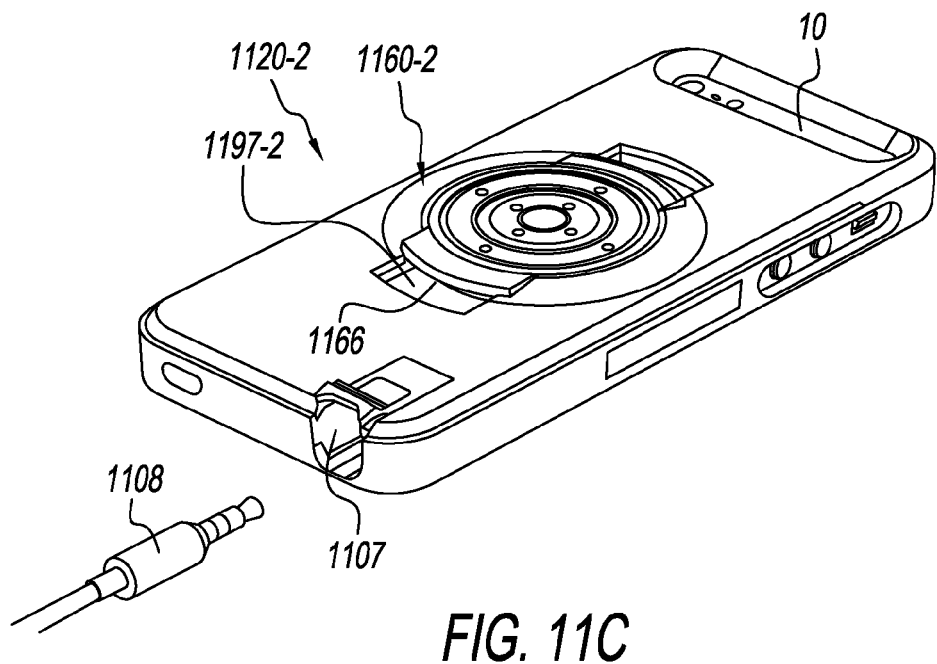
FIG. 11C
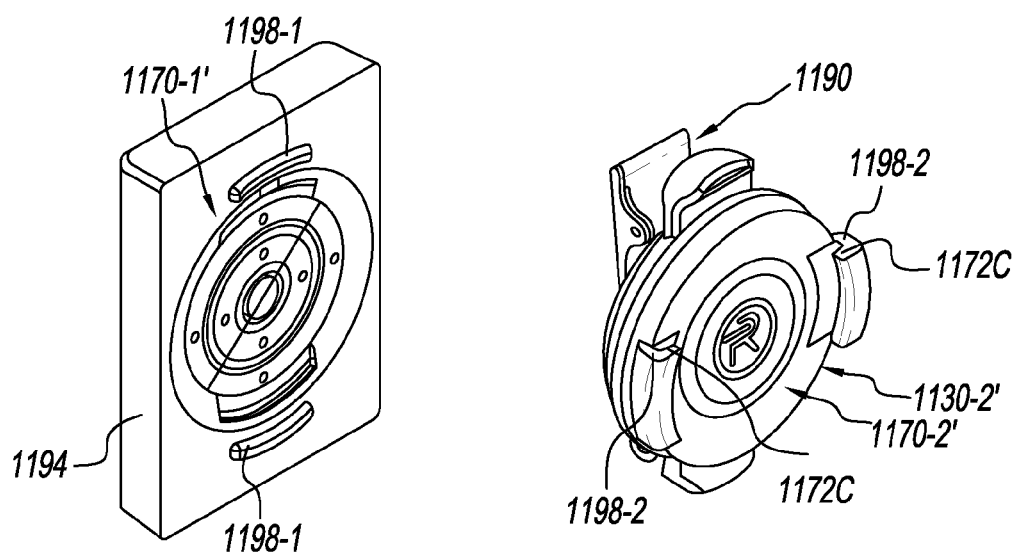
FIG. 11D
FIG. 11E

SYSTEM FOR MECHANICALLY AND ELECTRICALLY CONNECTING A MOBILE DEVICE CASE TO DIFFERENT MOUNTS

PRIORITY

This application claims the benefit of U.S. patent application Ser. No. 14/297,471 filed Jun. 5, 2014, which claims priority to U.S. Provisional Application No. 61/908,353, filed Nov. 25, 2013, both of which are hereby incorporated by reference in their entirety.

FIELD OF THE DISCLOSURE

Embodiments of the present invention relate generally to systems for mechanically and electrically connecting a case for a mobile device to different mounts, and more particularly to such system that provide (among other things) integrated mechanical and electrical connections between the case and a given one of the different mounts.

BACKGROUND

Mobile devices have become prevalent in the everyday life of many people. For instance, there are approximately 6.8 billion mobile telephony subscriptions worldwide, which refers to the number of devices or SIM cards being used, noting that many people have multiple devices or multiple accounts. This number is continuously increasing, and the mobile device market continues to grow at an astonishing rate.

Furthermore, people have come to rely on their mobile device for a variety of tasks, including, but certainly not limited to phone calls, text messages, emails, social media, entertainment, taking photographs or pictures, video chat, watching or downloading videos and other media, navigation assistance, for example, via GPS, etc. Particularly, users generally need or want to use their mobile device(s) while doing various activities (whether indoor or outdoor) throughout the day, including, for example, during travel in a car, bicycle, or walking, at a concert, wedding, or other social setting or activity, etc. If the mobile device is unavailable, for example, because it is incompatible with the activity and/or because there is insufficient charge in the battery, then the user may experience frustration and/or may perceive the utility of the mobile device as diminished.

Just as there are many types of mobile devices, there are also many different types of communication (data and/or audio) connectors and charging connectors by which to connect such devices to other devices, e.g., computers, headphones, chargers, etc. For example, in terms of the smartphone type of mobile device for the year 2013, there were at least seven manufacturers with significant market share. Of the seven manufacturers, however, two combined to have about 50% of the U.S. market (SAMSUNG® at about 26%-30% and APPLE® at about 15%-20%). While the majority of SAMSUNG® brand smartphones and APPLE® brand smartphones use the same connector for making data and/or charging connections, the SAMSUNG® brand data and/or charging (hereinafter "data/charging") connectors are incompatible with the APPLE® brand data/charging connectors. Furthermore, within a given brand, different models of smartphones might require different data/charging connectors, e.g., the APPLE® brand IPHONE® 4 models use a different data/charging connector than the APPLE® brand IPHONE® 5 models.

SUMMARY

It is to be understood that both the following summary and the detailed description are exemplary and explanatory and are intended to provide further explanation of the invention as claimed. Neither the summary nor the description that follows is intended to define or limit the scope of the invention to the particular features mentioned in the summary or in the description. Rather, the scope of the invention is defined by the appended claims.

In certain embodiments, the disclosed embodiments may include one or more of the features described herein.

In one aspect of the present technology, there is provided a system for mechanically and electrically connecting to a mobile device that includes a first connector having an exposed first set of one or more electrodes. Such a system includes: a mount; and a case removably attachable to the mount and configured to removably receive the mobile device at least partially. The case includes: a second connector, configured to removably engage the first connector, and having an exposed second electrode set corresponding to the first set, respectively; and a first mating part that includes an integral and exposed third electrode set corresponding at least in part to and electrically connected to the second set, respectively. The mount includes a second mating part having an integral and exposed fourth electrode set corresponding to the third set, respectively. And the first and the second mating parts are removably engageable and configured to provide mechanical and electrical connections between the case and the mount.

In another aspect of the present technology, there is provided a coupling arrangement that includes a projection and a corresponding receptacle. A proximal end of the projection has a flange. The projection includes an integral exposed first set of electrodes, at least a first one thereof being formed in an exposed location on the flange, and at least a second one thereof being formed in an exposed location on a distal end of the projection. The receptacle includes walls that define a recess having sides and a bottom, the recess being configured to removably receive the projection. One or more of the walls provides one or more bearing surfaces outside the recess configured to support the flange. The receptacle includes an integral second electrode set corresponding to the first set, respectively, at least a first one thereof being formed in at least one exposed location on one or more of the bearing surfaces, and at least a second one thereof being formed in an exposed location at the bottom of the recess. The projection and the recess are correspondingly sized so that the second electrode at the distal end of the projection is disposed in contact with the second electrode at the bottom of the recess when the first electrode at the flange is disposed in contact with the first electrode at the one or more bearing surfaces.

In another aspect of the present technology, there is provided a coupling arrangement which includes a first mating part and a second mating part. The first mating part includes: a first base; a projection extending from the first base; and annular groove segments formed in the base adjacent to the projection. The second mating part includes: a second base into which is formed a receptacle including walls that define a recess having sides and a bottom, the recess being configured to removably receive the projection; and tabs, located adjacent to the recess and extending from the second base, and configured to removably engage the annular groove segments. A distal end of the projection includes an integral exposed first set of electrodes. The bottom of the receptacle includes an integral second electrode set corresponding to the first set, respectively. The projection and the recess are correspondingly sized so that the first and second electrode sets are disposed in contact, respectively, when the distal end of the projection abuts the bottom of the recess.

These and further and other aspects and features of the invention are apparent in the disclosure, which includes the above and ongoing written specification, with the drawings.

BRIEF DESCRIPTION OF THE DRAWINGS

The accompanying drawings, which are incorporated herein and form a part of the specification, illustrate exemplary embodiments and, together with the description, further serve to enable a person skilled in the pertinent art to make and use these embodiments and others that will be apparent to those skilled in the art. The invention will be more particularly described in conjunction with the following drawings wherein:

FIGS. 5A-5B illustrate views in accordance with at least one other embodiment of the present invention, with FIG. 5A being a simple cross-section of a mobile device and a case, and FIG. 5B being partial, exploded views of FIG. 5A;

FIGS. 5C-5D illustrate views in accordance with at least one other embodiment of the present invention, with FIG. 5C being a simple cross-section of a mobile device and another case, and FIG. 5D being partial, exploded views of FIG. 5C;

FIGS. 5E-5F illustrate views in accordance with at least one other embodiment of the present invention, with FIG. 5E being a simple cross-section of a mobile device and another case, and FIG. 5F being a partial, exploded view of FIG. 5E;

FIGS. 6A-6B illustrate views in accordance with at least one other embodiment of the present invention, with FIG. 6A being a simple cross-section of a mobile device and another case, and FIG. 6B being partial, exploded views of FIG. 6A;

FIGS. 7A-7B illustrate views in accordance with at least one other embodiment of the present invention, with FIG. 7A being a simple cross-section of a mobile device and another case plus an auxiliary device connectable to the case, and FIG. 7B being partial, exploded views of FIG. 7A;

FIGS. 8A-8H illustrate views (case and mobile device not illustrated) in accordance with at least one other embodiment of the present invention, with FIGS. 8A-8B being first and second three-quarter perspective front views, respectively, FIG. 8C being a top plan view, FIGS. 8D-8E being left and right elevation views, respectively, FIGS. 8F-8G being top and bottom elevation views, respectively, and FIG. 8H being a bottom plan view, of another system for mechanically and electrically connecting a mobile device case to a mount;

FIGS. 8I-8K illustrate additional views in accordance with at least the embodiment of FIGS. 8A-8H, with FIG. 8I being a simple cross-section of a mobile device and another case and with FIGS. 8J-8K being partial cross-sections of the system, and more particularly an attachment assembly of the system, with FIG. 8J illustrating radially displaceable flanges disposed in an extended position, and with FIG. 8K illustrating radially displaceable flanges disposed in a retracted position;

FIGS. 8L-8N illustrate additional views in accordance with at least the embodiment of FIGS. 8A-8K, with FIG. 8L being an exploded bottom end elevation view of the system, FIG. 8M illustrating an exploded side elevation view of the system; and FIG. 8N (case and mobile device not illustrated) being an alternative left elevation view with respect to FIG. 8D;

FIGS. 8O-8U illustrate additional views (mount not illustrated) in accordance with at least the embodiment of FIGS. 8A-8N, with FIGS. 8O and 8U being first and second perspective rear views, respectively, FIG. 8T being a bottom plan view, FIGS. 8P and 8R being left and right elevation views, respectively, and FIGS. 8Q and 8S being bottom and top elevation views, respectively, of a mobile device contained in a case compatible with the system;

FIGS. 9A-9G illustrate views (case and mobile device not illustrated) in accordance with at least one other embodiment of the present invention, with FIGS. 9B and 9G being first and second perspective views, respectively, FIG. 9D being a top plan view, FIGS. 9C and 9E being left and right elevation side views, respectively, and FIGS. 9A and 9G being front and back elevation views, respectively, of another system for mechanically and electrically connecting a mobile device case (not illustrated) to a mount, e.g., compatible with the system of FIGS. 8A-8T;

FIGS. 9J-9K illustrate additional views (case and mobile device being illustrated) in accordance with at least the embodiment of FIGS. 9A-9I, with FIG. 9J being an exploded bottom end elevation view of the system, and FIG. 9K being an exploded side elevation view of the system;

FIGS. 10A-10C illustrate views in accordance with at least one other embodiment of the present invention, with FIG. 10A being a simple cross-section of a mobile device and another case, with FIGS. 10B-10C illustrating partial cross-sections of another system for magneto-mechanically and electrically connecting a mobile device case to a mount (not illustrated in FIGS. 10A-10C) as well as an external device (not illustrated in FIGS. 10A-10C) to the case and/or the mount (not illustrated in FIGS. 10A-10C), with FIGS. 10A-10C more particularly illustrating first and second attachment assemblies of the system;

FIGS. 10E-10G 10G-10I illustrate additional views in accordance with at least the embodiment of FIGS. 10A-10F, with FIG. 10G being an exploded three-quarter front perspective view of the system (external device not illustrated), FIG. 10H being an unexploded three-quarter rear perspective view of the system (external device not illustrated), and FIG. 10I being an exploded three-quarter rear perspective view of the system (case and mobile device not illustrated);

FIGS. 10J-10K illustrate additional views (external device not illustrated) in accordance with at least the embodiment of FIGS. 10A-10I, with FIG. 10J being an exploded three-quarter perspective front view of the case, the mobile device and an alternate mount, and with FIG. 10K being an unexploded three-quarter perspective rear view of the case, the mobile device and the alternate mount;

FIGS. 10L-10N illustrate additional views in accordance with at least the embodiment of FIGS. 10A-10K, with FIG. 10L being an unexploded three-quarter perspective front view of the case, the mobile device and the external device (mount not illustrated), with FIG. 10M being an unexploded three-quarter perspective rear view of the case, the mobile device and the external device (mount not illustrated), and FIG. 10N being an exploded three-quarter perspective front view of the case, the mobile device and the external power source (mount not illustrated);

FIGS. 11C-11I illustrate additional views in accordance with at least the embodiments of FIGS. 11A-11B, with FIG. 11C being a perspective rear view of a case and a mobile device contained therein (mount not illustrated), FIG. 11D being perspective rear view of an external device (mobile device, case and mount not illustrated), FIGS. 11E-11F being front and rear perspective views of a first version of a mount (mobile device and case not illustrated), respectively, FIG. 11G being a front perspective view of a second version of a mount (mobile device and case not illustrated), FIG. 11H being a front perspective view of a third version of a mount (mobile device and case not illustrated), and FIG. 11I being a front perspective view of a fourth version of a mount (mobile device and case not illustrated)

DETAILED DESCRIPTION

Figure 1:
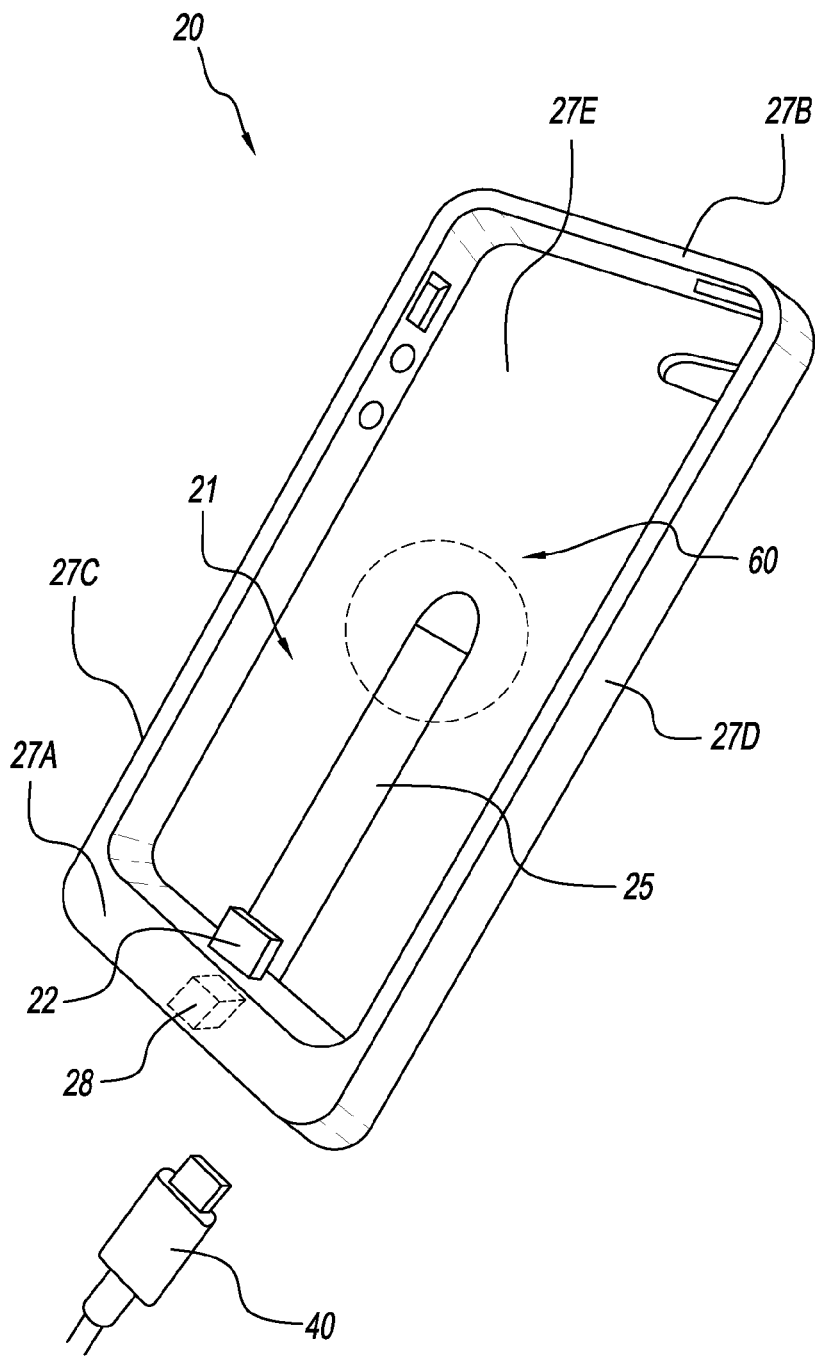
FIG. 1 is a three-quarter perspective front view of a case for a mobile device as disclosed in accordance with at least one embodiment of the present invention.

Embodiments of systems for mechanically and electrically connecting a mobile device case to different mounts will now be disclosed in terms of various exemplary embodiments. This specification discloses one or more embodiments that incorporate features of the invention. The embodiment(s) described, and references in the specification to "one embodiment", "an embodiment", "an example embodiment", etc., indicate that the embodiment(s) described may include a particular feature, structure, or characteristic. Such phrases are not necessarily referring to the same embodiment. When a particular feature, structure, or characteristic is described in connection with an embodiment, persons skilled in the art may effect such feature, structure, or characteristic in connection with other embodiments whether or not explicitly described.

In the several figures, like reference numerals may be used for like elements having like functions even in different drawings. The embodiments described, and their detailed construction and elements, are merely provided to assist in a comprehensive understanding of the invention. Thus, it is apparent that the present invention can be carried out in a variety of ways, and does not require any of the specific features described herein. Also, well-known functions or constructions are not described in detail since they would obscure the invention with unnecessary detail. Any signal arrows in the drawings/figures should be considered only as exemplary, and not limiting, unless otherwise specifically noted.

The description is not to be taken in a limiting sense, but is made merely for the purpose of illustrating the general principles of the invention, since the scope of the invention is best defined by the appended claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items. As used herein, the singular forms "a", "an" and "the" are intended to include the plural forms as well, unless the context clearly indicates otherwise.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In the course of developing embodiments of the present invention, the inventor observed the following. To preserve the option of being able to make a data connection and/or charge a given mobile device whenever she/he pleases, and thereby reduce the potential for the user to experience frustration and/or perceive the smartphone as having diminished utility, it is necessary for the user to carry the corresponding brand of data and/or charging (again, "data/charging") connector. It is common for a person and/or a family to have multiple smartphone-type mobile devices, and for two or more of the devices to have different data/charging connectors. As a consequential problem, it is common for a person and/or a family to have to carry multiple different data/charging connectors in addition to the multiple different smartphones.

At least some embodiments of the present invention help to solve the problem observed by the inventor (noted above). Such embodiments do so by providing an on-the-go data-connection/charging system that facilitates data-connecting/charging mobile devices while reducing the need for a user to carry separate data/charging connectors for each different mobile device.

Again, embodiments of the present invention relate generally to systems for mechanically and electrically connecting a mobile device case to different mounts. Such systems include a coupling arrangement having one mating part on the back of the case and a corresponding mating part that is commonly provided on the different mounts (e.g., a desk mount, car mount, a bicycle mount, belt clip, arm band, and/or removable external battery). Such a coupling arrangement provides integrated mechanical and electrical connections between the case and a given one of the mounts. In addition to the integration of the mechanical and electrical connections, an advantage of locating one of the mating parts on the back of the case is facilitation of unencumbered use of the mobile device's headphone jack while the case-enclosed device is mounted, as contrasted with docking arrangements that encumber the headphone jack.

Figure 2:
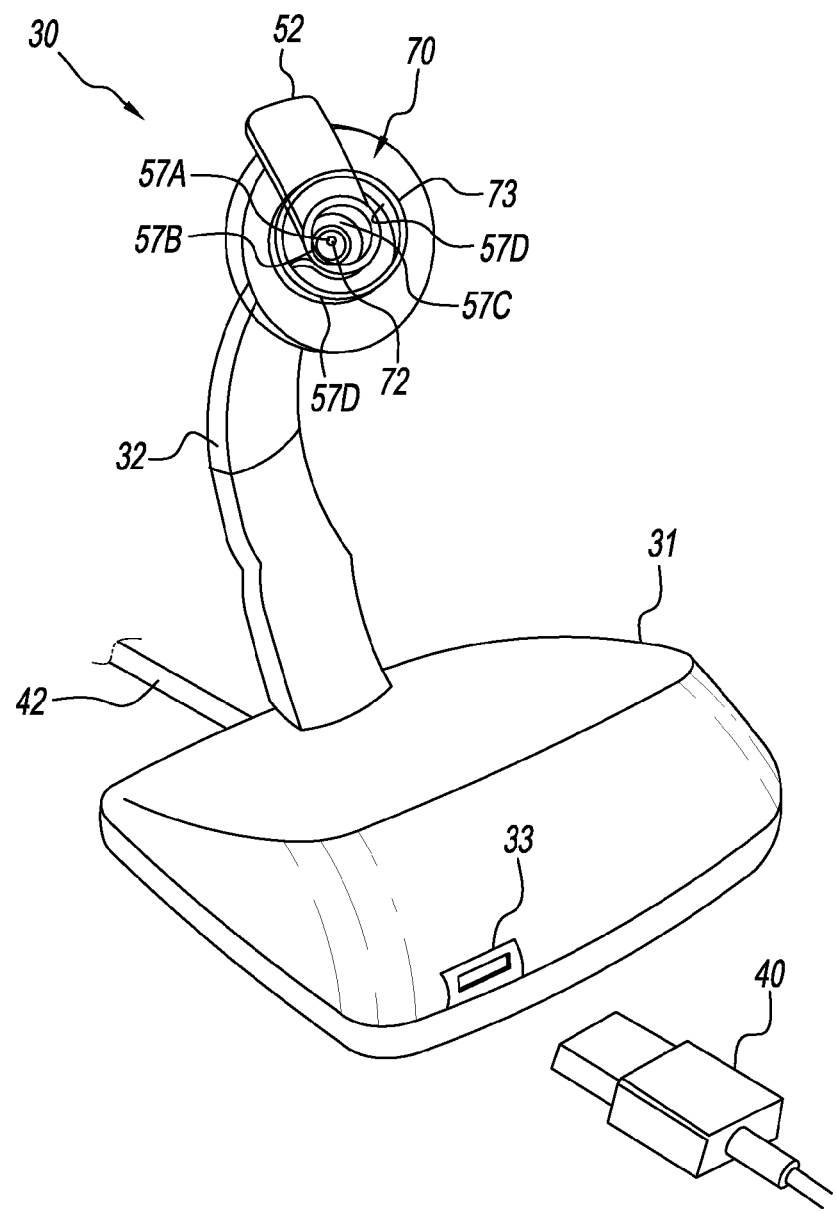
FIG. 2 is a three-quarter perspective front view of a mount as disclosed in accordance with at least one embodiment of the present invention.

As shown in the accompanying drawings, embodiments of the present invention are directed to systems comprising a mobile device case (e.g., 20 FIG. 1) and an electrically coupled and mechanically coupled mount (e.g., 30 FIG. 2). Particularly, as will become apparent from the description provided herein, such cases and mounts are disposable into and out of a mechanically connected (or, in other words, mountable) relations with one another. In at least some of the embodiments, such cases and mounts are disposable in mechanically-connected and electrically-connected relations with one another. Furthermore, as will become apparent from the description provided herein, at least some of the embodiments may include a plurality of different mounts each comprising a universal or cooperative attachment structure (or, in other words, such a universal or cooperative attachment is commonly provided on the different mounts) such that a single instance of such a case may be removably and selectively connected to each of a variety of different mounts, as desired. For example, such mounts may include, but are not limited to, a desk mount, car mount, a bicycle mount, belt clip, arm band, and/or battery pack. Accordingly, a user may selectively mount or connect a single instance of such a case with each of such mounts throughout the day, wherein at least some of such mounts may be electrically coupled with the single instance of such a case, thereby providing a data connection and/or charging connection to the mobile device installed in the single instance of such a case.

FIG. 1 is a three-quarter perspective front view of a case 20 for a mobile device 10 (not illustrated in FIG. 1, but see FIGS. 10A, 10C, etc.) as disclosed in accordance with at least one embodiment of the present invention. For example, mobile device 10, as used herein, may include, but is in no way limited to, a mobile or cellular phone (e.g., a smartphone), media device, mp3 or music player, game console, tablet computer, laptop computer, etc.

In FIG. 1, case 20 includes a bottom wall 27A, a top wall 27B, side walls 27C-27D and a bottom wall 27E. Walls 27A-27E define a recessed portion (or compartment) 21 in case 20 that is structured and dimensioned (or, in other words, configured) to removably receive and at least partially house or contain (or, in other words, accommodate) mobile device 10 (again, not illustrated in FIG. 1, but see FIGS. 10A, 10C, etc.) in a connected relation with case 20. It should be noted that recessed portion 21 and, therefore the case 20, may include different dimensions, configurations, etc., depending, for example, on the type of mobile device which a given instance of case 20 is designed to at least partially house/contain (or, in other words, accommodate). For example, a given instance of case 20 configured to accommodate an APPLE® IPHONE® may be slightly different in dimensions and/or design than another given instance of case 20 that is configured to accommodate an ANDROID® phone.

A mobile device (not illustrated in FIG. 1, but see FIG. 10A, etc.) typically has one or more ports/connectors for making electrical, e.g., data connections and/or audio connections and/or charging/power connections, to external devices. Typically, ports/connectors on a mobile device have a female configuration, e.g., are configured as a socket. Each such socket has an exposed set of one or more electrodes (not illustrated in FIG. 1). Here, it is assumed that mobile device 10 includes at least a first data and/or charging (hereinafter "data/charging") connector configured as a socket, the first data/charging connector being provided with an exposed first set of one or more electrodes. Examples of such data/charging connector configurations include the APPLE® brand LIGHTNING® model connector, the APPLE® brand 30-pin model connector, the family of models of Universal Serial Bus ("USB") standard connectors, etc.

Also in FIG. 1, case 20 further includes a second data/charging connector 22 attached to bottom wall 27A, e.g., formed into wall 27A. As such, connector 22 is exposed to (or, in other words, projects into) recessed portion 21. As it projects into recessed portion 21, connector 22 can be described as an internal connector. Connector 22 is configured to correspond to the data/charging socket connector of mobile device 10. Accordingly, connector 22 is configured as a plug that has an exposed second electrode set corresponding to the first electrode set of the data/charging socket connector of mobile device 10, respectively.

When mobile device 10 is inserted into case 20 (or, in other words, disposed in a connected or housed relation with the case 20), data/charging plug connector 22 is removably inserted into the data/charging socket connector of mobile device 10. Such insertion removably engages data/charging plug connector 22 and the data/charging socket connector of mobile device 10 so that a mechanical connection is made between plug connector 22 an the socket connector, and so that electrical connections are made between corresponding individual electrodes of the exposed first and second electrode sets, respectively.

Case 21 further includes a third data/charging connector (not illustrated in FIG. 1) that is attached to, e.g., back wall 27E, e.g., formed into back wall 27E. Whereas connector 22 is an internal connector, by contrast, the third connector can be described as an exterior connector because it is exposed to the exterior of case 21. The third connector comprises part of a case attachment structure 60 (illustrated in more detail in, e.g., FIGS. 3-4—discussed below), with case attachment structure 60 comprising part of an attachment assembly 50 (not illustrated in FIG. 1, but see FIG. 3—discussed below). The third connector can be formed with an exposed third electrode set corresponding to the first electrode set of the data/charging socket connector of mobile device 10, respectively. An internal connection 25 is provided on back wall 27E. Internal connection 25 contains leads (not illustrated in FIG. 1) that electrically connect corresponding individual electrodes of the exposed second and third electrode sets, respectively. Alternatively, such leads can be contained in back wall 27E, e.g., embedded therein.

Optionally (as denoted by phantom lines), case 20 can be provided with a fourth data/charging connector 28 attached (e.g., formed into) to an exterior of one of the walls, e.g., e.g., bottom wall 27A. Like the first data/charging socket connector of mobile device 10, optional fourth data/charging connector 28 can be configured as a socket, and can be provided with an exposed fourth electrode set corresponding to the first electrode set of the first data/charging socket connector of mobile device 10, respectively. Optional leads (not illustrated in FIG. 1) can be provided in (contained in) bottom wall 27A (e.g., embedded therein) that electrically connect corresponding individual electrodes of the exposed second and fourth electrode sets, respectively.

Also illustrated in FIG. 1 is a data/charging cable 40 that is terminated in a fifth data/charging connector configured as a plug that is provided with a fifth electrode set corresponding to the first electrode set of the data/charging socket connector of mobile device 10, respectively. As such, the fifth data/charging plug connector of cable 40 can be removably inserted into optional data/charging socket connector 28 so that electrical connections are made between corresponding individual electrodes of the exposed fourth and fifth electrode sets, respectively.

FIG. 2 is a three-quarter perspective front view of a mount 30 as disclosed in accordance with at least one embodiment of the present invention.

Mount 30 is a gravity mount that includes a base 31 which can be disposed on a support surface (not illustrated), e.g., a desk, countertop, table, etc. An extension 32 connected to the base 31 is illustrated, although other configurations and structures are contemplated within the full spirit and scope of the various embodiments of the present invention. For instance, the extension may include a rigid support, flexible or positionable support, a gooseneck flex cable, etc.

In FIG. 2, an external power source (not illustrated) can be disposed in an electrically coupled relation to mount 30 via cable 40. As such, mount 30 may include an input port/connector 33 removably connectable to the data/charging connector of cable 40. For example, port/connector 33 and the fifth data/charging plug connector of cable 40 may configured as corresponding connectors (e.g., as socket and plug) conforming to one of the USB standard connector models, although other standards, cables, and connectors are certainly contemplated within the various embodiments of the present invention. Removable cable 40 may connect, e.g., directly to a power outlet (e.g., via a transformer or other outlet connector), a computer, an external battery, or other power source. In other embodiments, there may be provided a dedicated power cable 42 that may be connected either removably (via a universal or proprietary connector, for example) or hardwired at one end to mount 30, and connected at its other end to a power source, such as, for example, a power outlet, computer, battery, etc.

Figure 3:
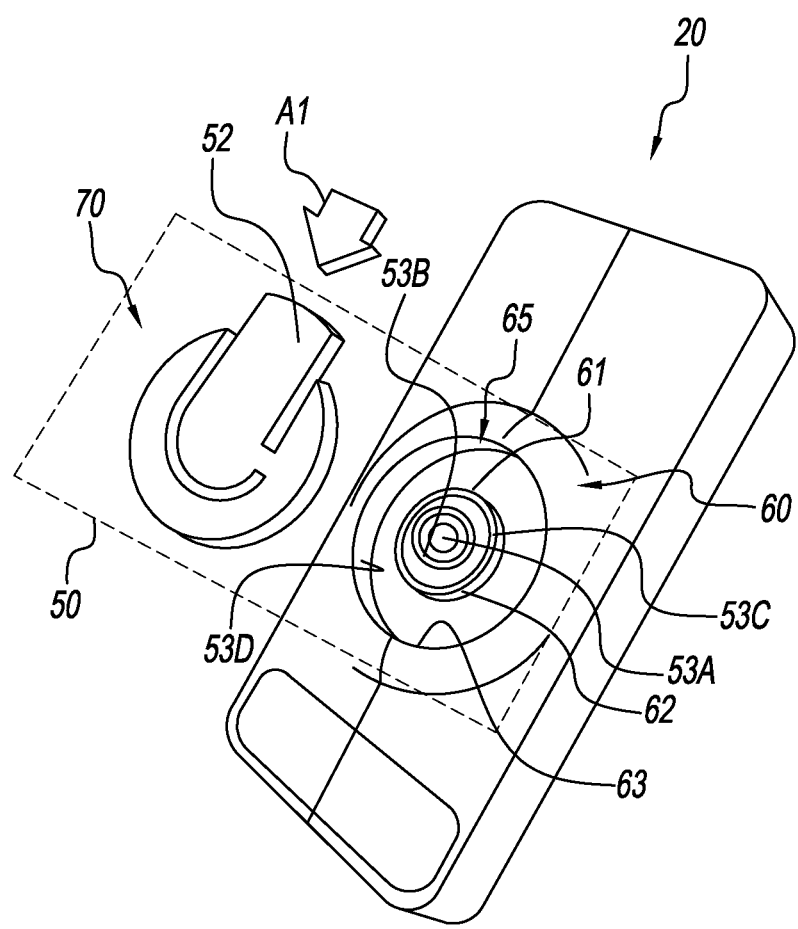
FIG. 3 is a three-quarter perspective partial rear view of a system for mechanically and electrically connecting a mobile device case to different mounts, and more particularly an attachment assembly of the system, in accordance with at least one embodiment of the present invention.

FIG. 3 is a three-quarter perspective partial rear view of a system for mechanically and electrically connecting a mobile device case to different mounts, and more particularly attachment assembly 50 of the system, in accordance with at least one embodiment of the present invention. And FIG. 4 is a partial cross-section of the attachment assembly illustrated in FIG. 3.

In FIG. 3, attachment assembly 50 is structured to facilitate an easy, removable attachment between case 20 and different mounts 30 (not illustrated in FIG. 3). Attachment assembly 50 includes case attachment structure 60 and a cooperatively configured mount attachment structure 70 that is commonly provided on the different mounts 30. For example, assume a situation in which there are two different types of mount 30, i.e., a first type of mount 30 and a second type of mount 30. The first type of mount 30 is provided with a first type of mount attachment structure 70. The second type of mount 30 is provided with a second type of mount attachment structure 70. In particular, attachment assembly 50 is structured to facilitate easy and selective disconnection by a user of case 20 (more particularly, case attachment structure 60) from the first type of mount attachment structure 70 found on the first type of mount 30 followed by easy and selective reconnection case 20 (more particularly, case attachment structure 60) to the second type of mount attachment structure 70 found on the second type of mount 30. As will be described herein, various attachment assemblies structured to facilitate the practice of the present invention in the intended manner are contemplated with the full scope of the present invention.

Figure 4:
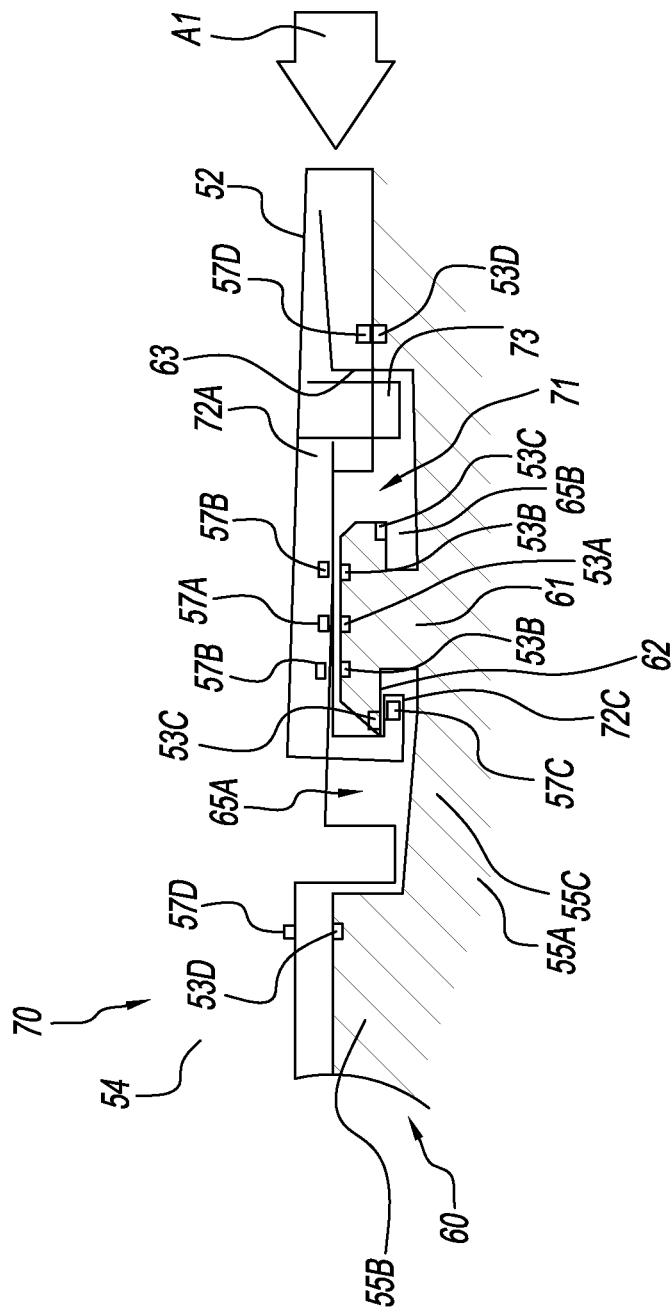
FIG. 4 is a partial cross-section of the attachment assembly illustrated in FIG. 3.

In FIGS. 3-4, case attachment structure 60 includes a base plate 55A into which is formed a recess 65A, with recess 65A being defined by an inner surface of one or more side walls 55B and a bottom wall 55C. For example, recess 65 can be cylindrical. Projecting from bottom wall 55C into recess 65A is a core member 61 whose distal end is substantially planar. A flange 62 extends from the distal end of core member 61 such that a groove 65B in core member 61 is defined between flange 62 and bottom wall 55C. For example, core member 61 can be cylindrical in cross-section and groove 65B can be annular. Also, for example, flange 62 may be a continuous annulus or may be formed of discrete annular segments.

Mount attachment structure 70 includes a base plate 54, one or more side walls 73 (extending substantially perpendicularly from base plate 54) and a locking and/or positioning ("LP") assembly 52. For example, the one or more side walls 73 there can define therebetween a channel (or, in other words, a recess) 71, e.g., a cylindrical recess. For example, a diameter of recess 71 (of mount attachment structure 70, defined between inner surfaces of side walls 55B) and a diameter of recess 65A (of case attachment structure 60, defined between outer surfaces of side walls 73) can be selected so that when mount attachment structure 70 is disposed onto case attachment structure 60, core member 61 becomes inserted into recess 71, and more particularly the outer surfaces of side walls 73 come to abut the inner surfaces of side walls 55B. Such abutment, e.g., promotes contact therebetween but would not induce enough friction so as to substantially impede, if not prevent, rotation of mount attachment structure 70 (about the long axis of core member 61, the long axis of core member 61 being substantially perpendicular to base plate 54) relative to case attachment structure 60. To further promote such contact, e.g., the outer surfaces of side walls 73 and the inner surfaces of side walls 55B can be correspondingly parallelly chamfered.

LP assembly 52 includes a substantially planar back plate 72A (disposed substantially parallel to base plate 54), a side wall or lip 72B (extending substantially perpendicularly from back plate 72A) and a flange 72C (extending substantially perpendicularly from side wall 72 and oriented substantially parallel to back plate 72A). For example, flange 62 may be implemented as one or more annular segments. Relative to the long axis of core member 61, LP assembly 52 can be configured to be radially displaceable. When side wall 72B and flange 72C are disposed radially away from the long axis of core member 61 (e.g., via manipulation of back plate 72A in the direction shown by an arrow A1 in FIG. 4), eventually a state of flange retraction is achieved in which the distal end of flange 72C is radially further away from the long axis of core member 61 than is the distal end of flange 62, thereby permitting mount attachment structure 70 to be disposed onto case attachment structure 60 such that core member 61 becomes inserted into recess 71. For example, to promote such insertion, the end(s) of flange 62 may be chamfered.

At the culmination of the insertion, the distal planar end of core member 61 comes to abut back plate 72A of LP assembly 52. Then, side wall 72B and flange 72C of core attachment structure 60 can be disposed radially towards the long axis of core member 61, eventually achieving a state of cooperative fitting engagement in which flange 62 is inserted into groove 65B, i.e., engages groove 65B.

As a first effect, the cooperative fitting engagement mechanically resists disengagement of case attachment structure 60 from mount attachment structure 70. As a second effect, the abutting engagement of side walls 73 of mount structure 70 and side walls 55B of case attachment structure 60 mechanically stabilizes the alignment of mount structure 70 and case attachment structure 60 along the long axis of core member 61. Together, the first and second effects yield a third effect, namely a mechanical connection between case attachment structure 60 and mount structure 70, and thus between case 20 and mount 30.

For example, to promote such insertion, the end(s) of flange 72C may be chamfered. Also for example, to promote achieving the state of cooperative fitting engagement, LP assembly 52 can be configured with a biasing assembly (not illustrated) that applies a biasing force, e.g., to back plate 72A radially towards the long axis of core member 61, thereby biasing side wall 72B and flange 72C of core attachment structure 60 towards their most radially inward position.

Manipulation of back plate 72A of LP assembly 52, e.g., by applying a force to back plate 72A in a direction radially outward/away from the long axis of core member 61 (in the direction shown by arrow A1 in FIG. 4) may cause LP assembly 52 to at least temporarily disengage so that mount attachment structure 70 may be rotated (around/about the long axis of core member 61) or repositioned within recess 65A, as desired. Removing such a radially outward force permits LA assembly 50 to be returned to the state of cooperative fitting engagement (described above).

It should be noted, however, and as described herein, the present invention is not limited to the particular details of core attachment structure 60 and mount attachment structure 70 illustrated in FIGS. 2-4. Accordingly, other attachment and/or locking assemblies may be implemented within the full spirit and scope of the various embodiments of the present invention.

Furthermore, as at least some of mounts (e.g., 30, described herein) may be electrically connected with corresponding cases (e.g., 20, described herein), mobile device 10 may be charged (or otherwise receive power) and/or make a data connection via case 20 (and more particularly case attachment structure 60) and mount 30 (and more particularly mount attachment structure 70). In FIG. 2, for example, mount attachment structure 70 of mount 30 may be electrically connected to power port 33 and/or dedicated power cable 42, thereby allowing power to be received by mobile device 10 from an external power supply (not illustrated in FIG. 2) through dedicated power cable 42 and mount attachment structure 70, and/or through removable cable 40 and port 33 and mount attachment structure 70, and/or data to be exchanged between mobile device 10 and an external device (not illustrated in FIG. 2) via removable cable 40 and port 33 and mount attachment structure 70. It should be noted that the electrical connections between mount attachment structure 70, cable 42, cable 40 and port 33 may be provided via one or more leads (not illustrated in FIGS. 2-4) disposed therebetween, respectively, and contained in mount 30.

To facilitate the making of electrical connections between at least some of mounts 30 (described herein) and cases 20 (described herein), attachment assembly 50 (more particularly, case attachment structure 60 and mount attachment structure 70) include cooperatively structured and arranged electrodes. For example, case attachment structure 60 can be provided with electrodes 53A-53D and mount attachment structure 70 can be provided with corresponding electrodes 57A-57D, respectively. Such electrodes can be formed, e.g., of electrically conductive material, such as metal or other materials.

In FIG. 4, attached to, e.g., formed in, the distal end of core member 61 are electrodes 53A and 53B, which are arranged to be exposed at the planar surface of the distal end of core member 61. Electrode 53A can be a pin (or dot) type of electrode located substantially on the long axis of core member 61. Electrode 53B can be an annular electrode centered substantially about the long axis of core member 61, with a radius approximately half of the radius of flange 62. Regarding LA assembly 52, attached to, e.g., formed in, back plate 72A are electrodes 57A and 57B, which are cooperatively structured and arranged to correspond to electrodes 53A and 53B, respectively. Electrodes 57A and 57B are arranged to be exposed at the planar surface of back plate 72 (which can be disposed so as to abut the planar distal end of core member 61). Electrode 57A can be a pin type of electrode and electrode 57B can be an annular electrode, which are sized and located so as to align with electrodes 53A and 53B, respectively, when mount attachment structure 70 and case attachment structure 60 are in the state of cooperative fitting engagement.

Also in FIG. 4, attached to, e.g., formed in, the distal end of flange 62 is electrode 53C. The underside of the distal end of flange 62 is substantially planar and is substantially parallel to the interior surface of flange 72C. Electrode 53C is arranged to be exposed at the planar underside surface of flange 62. Regarding LA assembly 52, attached to, e.g., formed in, flange 62 is electrode 57C, which is cooperatively structured and arranged to correspond to electrode 53C. Electrodes 57C is arranged to be exposed at the interior surface of flange 62. Electrode 53C and 57C can be described as corresponding annular electrodes, sized and located so as to align with each other when mount attachment structure 70 and case attachment structure 60 are in the state of cooperative fitting engagement.

Yet also in FIG. 4, attached to, e.g., formed in, side wall 55B of case attachment structure 60 is electrode 53D. Electrode 53D is arranged to be exposed at the surface of side wall 55B. Regarding mount attachment structure 70, attached to, e.g., formed in, back plate 72 is electrode 57D, which is cooperatively structured and arranged to correspond to electrode 53D. Electrode 57D is arranged to be exposed at the exterior surface of back plate 72. Electrode 53D and 57D can be described as corresponding annular electrodes sized and located so as to align with each other when mount attachment structure 70 and case attachment structure 60 are in the state of cooperative fitting engagement.

It is noted that other locations for corresponding electrodes are contemplated. In particular, such other locations can be anywhere within attachment assembly 50 where case attachment structure 60 and mount attachment structure 70 abuttingly engage with one another.

As noted, case attachment structure 60 and mount structure 70 mechanically connect case 20 and mount 30. Also as noted, electrodes in case attachment structure 60 and mount structure 70 electrically connect case 20 and mount 30. As such, attachment assembly 50 (which is comprised by case attachment structure 60 and mount structure 70) provides integrated mechanical and electrical connections between case 20 and mount 30. In other words, the electrical connections between case 20 and mount 30 (namely, the electrical connections made by attachment assembly 50) are integrated with the mechanical connections between case 20 and mount 30 (namely, the mechanical connections made by attachment assembly 50).

As a first effect, the cooperative fitting engagement mechanically resists disengagement of case attachment structure 60 from mount attachment structure 70.

As a second effect, the abutting engagement of side walls 73 of mount structure 70 and side walls 55B of case attachment structure 60 mechanically stabilizes the alignment of mount structure 70 and case attachment structure 60 along the long axis of core member 61. Together, the first and second effects yield a third effect, namely achievement of a mechanical connection between case attachment structure 60 and mount structure 70, and thus between case 20 and mount 30.

FIGS. 5A-5B illustrate views in accordance with at least one other embodiment of the present invention, with FIG. 5A being a simple cross-section of a mobile device 10 and a case 520A, and FIG. 5B being partial, exploded views 512A and 514A of FIG. 5A. It is noted that FIGS. 5A-5B has similarities with respect to FIGS. 1-4.

In FIGS. 5A-5B, case 520A includes a back wall 522A and side walls 524A and 526A, plus two additional side walls 528A-530A (not illustrated in FIGS. 5A-5B). Walls 522A-530A define a recess that partially receives mobile device 10 such that a back side of mobile device 10 is disposed towards, e.g., abuts, back wall 522A. Alternatively, one or more of side walls 524A-530A can be extended to fully cover the corresponding side of the phone, and or above a front side and or wrap partially around a front side of mobile device 10.

Mobile device 10 includes a first connector 532A that has an exposed first set of one or more electrodes 534A. One or more leads 536A that connect to various circuit nodes (not illustrated) in mobile device 10 (not illustrated) terminate in first electrode set 534A, respectively.

Side wall 524a includes a second connector 538A that has an exposed second electrode set 540A corresponding to first electrode set 534A, respectively. First connector 532A and second connector 538A are configured to removably engage each other. First connector 532A and second connector 538A are illustrated as having a female configuration (e.g., a socket) and a male configuration (e.g., a plug), respectively; alternatively, the converse is contemplated. For example, first connector 532A and second connector 536A can be compatible with a standard computer bus format, e.g., an APPLE® computer bus format, a Universal Serial Bus (USB) computer bus format, etc.

First connector 532A and second connector 538A are configured to removably engage each other. First connector 532A and second connector 538A are illustrated as having a female configuration (e.g., a socket) and a male configuration (e.g., a plug), respectively; alternatively, the converse is contemplated. For example, first connector 532A and second connector 536A can be compatible with a standard computer bus format, e.g., an APPLE® computer bus format, a Universal Serial Bus (USB) computer bus format, etc.

An exterior surface of back wall 522A (relative to the other side thereof against which is disposed, e.g., abuts, the back side of mobile device 10) includes a third connector 542A that has an exposed third electrode set corresponding to second electrode set 540A, respectively. FIG. 5B also illustrates a partial cross-section of a fourth connector 546A that that has an exposed fourth electrode set corresponding to the third electrode set of third connector 542A, respectively. Third connector 542A and fourth connector 546A are configured to removably engage each other. For example, third connector 542A and fourth connector 546A comprise an attachment assembly 550A that can correspond similarly to attachment assembly 50 such that third connector 542A and fourth connector 546A can correspond similarly to case attachment structure 60 and mount attachment structure 70, respectively, of FIGS. 2-3.

One or more leads 554A connect electrodes of second electrode set 540A to electrodes of the third electrode set of third connector 542A, respectively. Leads 554A can be contained, e.g., in side wall 524A and back wall 522A. More particularly, for example, leads 554A can be embedded in the material, e.g., a rubber or thermoplastic or resinous material, which forms side wall 524A and back wall 522A.

FIGS. 5C-5D illustrate views in accordance with at least one other embodiment of the present invention, with FIG. 5C being a simple cross-section of a mobile device 10 and another case 520C, and FIG. 5D being partial, exploded views 512C and 514C of FIG. 5C.

It is noted that FIGS. 5C-5D are similar to FIGS. 5A-5B (among others). Accordingly, for the sake of brevity, the discussion of FIGS. 5C-5D will tend to focus on differences of FIGS. 5C-5D with respect to FIGS. 5A-5B.

An exterior surface of back wall 522C (relative to the other side thereof against which is disposed, e.g., abuts, the back side of mobile device 10) includes a third connector 542C that has an exposed third electrode set 544C corresponding to second electrode set 540C, respectively. FIG. 5D also illustrates a cross-section of a fourth connector 546C that has an exposed fourth electrode set 548C. Fourth connector 546C is attached to a cable 550C. One or more leads 551C that connect to various circuit nodes (not illustrated) in an external device (not illustrated) terminate in fourth electrode set 548C, respectively.

Third connector 542C and fourth connector 546C are configured to removably engage each other. Third connector 542C and fourth connector 546C are illustrated as having a female configuration (e.g., a socket) and a male configuration (e.g., a plug), respectively; alternatively, the converse is contemplated. For example, third connector 544CA and fourth connector 546C can be compatible with a standard computer bus format, e.g., an APPLE® computer bus format, a Universal Serial Bus (USB) computer bus format, etc.

One or more leads 554C connect electrodes of second electrode set 540C to electrodes of third electrode set 544C of third connector 542C, respectively. Leads 554C can be contained, e.g., in side wall 524C and back wall 522C. More particularly, for example, leads 554C can be embedded in the material, e.g., a rubber or thermoplastic or resinous material, which forms side wall 524C and back wall 522C.

FIGS. 5E-5F illustrate views in accordance with at least one other embodiment of the present invention, with FIG. 5E being a simple cross-section of a mobile device 10 and another case 520E, and FIG. 5F being a partial, exploded view 512E of FIG. 5E.

It is noted that FIGS. 5E-5F are similar to FIGS. 5C-5D (among others). Accordingly, for the sake of brevity, the discussion of FIGS. 5E-5F will tend to focus on differences of FIGS. 5E-5F with respect to FIGS. 5C-5D.

In FIGS. 5E-5F, side wall 524E (rather than back wall 522E) includes a third connector 542E that has an exposed third electrode set 544E corresponding to second electrode set 540E, respectively. More particularly, an exterior surface of side wall 524E (relative to the other side thereof against which is disposed, e.g., abuts, the end side of mobile device 10) includes third connector 542E. FIG. 5F also illustrates a cross-section of a fourth connector 546E that has an exposed fourth electrode set 548E. Fourth connector 546E is attached to a cable 550E. One or more leads 551E that connect to various circuit nodes (not illustrated) in an external device (not illustrated) terminate in fourth electrode set 548E, respectively.

Third connector 542E and fourth connector 546E are configured to removably engage each other. Third connector 542E and fourth connector 546E are illustrated as having a female configuration (e.g., a socket) and a male configuration (e.g., a plug), respectively; alternatively, the converse is contemplated. For example, third connector 544E and fourth connector 546E can be compatible with a standard computer bus format, e.g., an APPLE® computer bus format, a Universal Serial Bus (USB) computer bus format, etc.

One or more leads 554E connect electrodes of second electrode set 540E to electrodes of third electrode set 544E of third connector 542E, respectively. Leads 554E can be contained, e.g., in side wall 524E. More particularly, for example, leads 554E can be embedded in the material, e.g., a rubber or thermoplastic or resinous material, which forms side wall 524E.

FIGS. 6A-6B illustrate views in accordance with at least one other embodiment of the present invention, with FIG. 6A being a simple cross-section of a mobile device 10 and another case 620A, and FIG. 6B being partial, exploded views 612 and 614 of FIG. 6A.

It is noted that FIGS. 6A-6B are similar to FIGS. 5A-5B and 5E-5B (among others). Accordingly, for the sake of brevity, the discussion of FIGS. 6A-6B will tend to focus on differences of FIGS. 6A-6B with respect to FIGS. 5A-5B and 5E-5F.

In FIGS. 6A-6B, both of back wall 622A and side wall 624A includes 'third' connectors corresponding to third connector 542A of FIGS. 5A-5B and third connector 542E of FIGS. 5E-5F, namely a $third_1$ ('third subscript 1') connector 642A1 and a $third_2$ ('third subscript 2') connector 642A2, respectively. $Third_1$ connector 642A1 has an exposed $third_1$ electrode set corresponding to second electrode set 640A, respectively. $Third_2$ connector 642A2 has an exposed $third_2$ electrode set 644A2 also corresponding to second electrode set 640A, respectively.

FIGS. 6A-6B also illustrate (at least in partial cross-section) $fourth_1$ ('fourth subscript 1') connectors corresponding to fourth connector 546A of FIGS. 5A-5B and fourth connector 546E of FIGS. 5E-5F, namely a $fourth_1$ ('fourth subscript 1') connector 646A1 (illustrated in partial cross-section) and a $fourth_2$ ('fourth subscript 2') connector 646A2, respectively. $Fourth_1$ connector 646A1 has an exposed $fourth_1$ electrode set corresponding to the third electrode set of $third_1$ connector 642A1, respectively. $Fourth_2$ connector 646A2 has an exposed $fourth_2$ electrode set 648A2 corresponding to $third_1$ electrode set 644A2, respectively. Also, $fourth_2$ connector 646A2 is attached to a cable 650A. One or more leads 651A that connect to various circuit nodes (not illustrated) in an external device (not illustrated) terminate in fourth electrode set 648A, respectively.

$Third_1$ connector 642A1 and $fourth_1$ connector 646A1 are configured to removably engage each other. $Third_2$ connector 642A2 and $fourth_2$ connector 646A2 are configured to removably engage each other.

One or more leads 654A1 connect electrodes of second electrode set 640A to electrodes of the third electrode set of $third_1$ connector 642A1, respectively. Similarly, one or more leads 654A2 connect electrodes of second electrode set 640A to $third_2$ electrode set 644A2, respectively. Leads 654A1 and 654A2 can be contained, e.g., in side wall 624A and or back wall 622A. More particularly, for example, leads 654A1 and 654A2 can be embedded in the material, e.g., a rubber or thermoplastic or resinous material, which forms side wall 624A and/or back wall 622A.

FIGS. 7A-7B illustrate views in accordance with at least one other embodiment of the present invention, with FIG. 7A being a simple cross-section of mobile device 10 and another case 720 plus an auxiliary device 760 connectable to case 720, and FIG. 7B being partial, exploded views 712 and 714 of FIG. 7A;

It is noted that FIGS. 7A-7B are similar to FIGS. 6G-6H (among others). Accordingly, for the sake of brevity, the discussion of FIGS. 7A-7B will tend to focus on differences of FIGS. 7A-7B with respect to FIGS. 6G-6H.

In FIGS. 7A-7B, both of back wall 722G and side wall 724G includes 'third' connectors corresponding to third connector 742A of FIGS. 6A-6B and third connector 742E of FIGS. 6E-6F, namely a $third_1$ ('third subscript 1') connector 742G1 and a $third_2$ ('third subscript 2') connector 742G2, respectively. $Third_1$ connector 742G1 has an exposed $third_1$ electrode set corresponding to second electrode set 740G, respectively. $Third_2$ connector 742G2 has an exposed $third_2$ electrode set 744G2 also corresponding to second electrode set 740G, respectively.

Similar to $third_2$ (again, 'third subscript 2') connector 642G2 and $fourth_2$ (again, 'fourth subscript 2') connector 646G2 of FIGS. 6G-6H, FIGS. 7A-7B illustrate a $third_2$ connector 742G2 and a $fourth_2$ connector 746G2, respectively, that are configured to removably engage each other. Whereas $fourth_2$ connector 646G2 of FIGS. 6G-H is attached to a cable 650G, $fourth_2$ connector 746G2 is attached to an external device 760 into which $fourth_2$ connector 746G2 is formed. One or more leads 751G that connect to various circuit nodes (not illustrated) in external device 760 terminate in fourth electrode set 748G2, respectively. For example, external device 760 can be a mobile battery pack, a mobile magnetic card reader (for reading magnetic stripe cards, e.g., credit cards), a mobile smart card or chip card or ICC (integrated circuit card) reader (for reading cards, typically pocket-sized, that include embedded integrated circuits), an external storage device (e.g., a flash/thumb drive, memory card, etc.), an antenna (e.g., 802.11-type wireless local area network (WLAN) compatible, WiFi, mobile telephony, etc.), a lens system, a sensor, etc.

FIGS. 8A-8H illustrate views (case 820 and mobile device 10 not illustrated) in accordance with at least one other embodiment of the present invention, with FIGS. 8A-8B being first and second three-quarter perspective front views, respectively, FIG. 8C being a top plan view, FIGS. 8D-8E being left and right elevation views, respectively, FIGS. 8F-8G being top and bottom elevation views, respectively, and FIG. 8H being a bottom plan view, of another system for mechanically and electrically connecting mobile device case 10 to a mount 830.

In FIGS. 8A-8H, mount 870 is adapted to include not only a mount attachment structure 870, but also a clip assembly 890, e.g., a belt clip assembly.

Figure 8K:
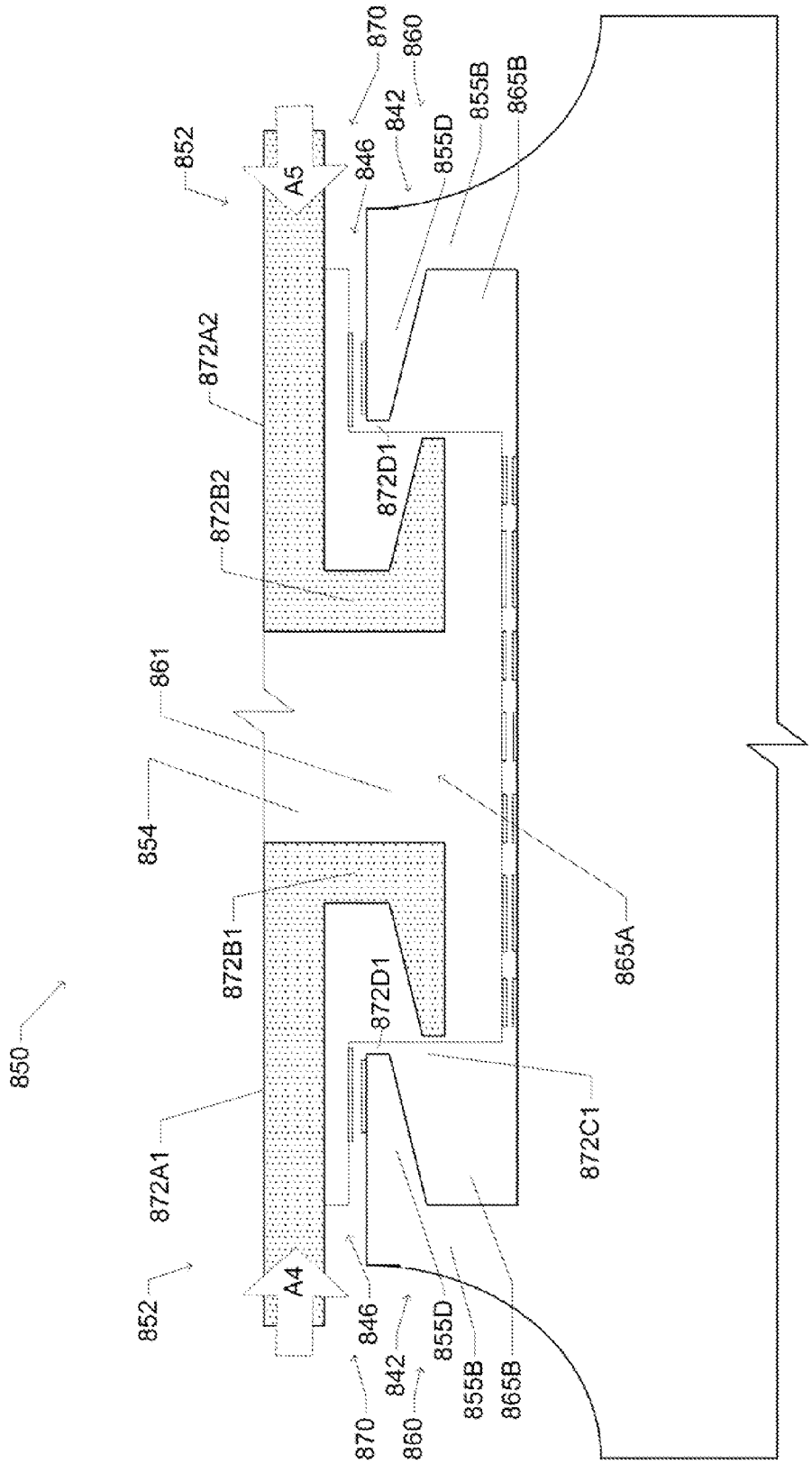

FIGS. 8I-8K illustrate additional views in accordance with at least the embodiment of FIGS. 8A-8H, with FIG. 8I being a simple cross-section of mobile device 10 and another case 820 and with FIGS. 8J-8K being partial cross-sections 814 of the system, and more particularly an attachment assembly 850 of the system, with FIG. 8J illustrating radially displaceable flanges disposed in an extended position, and with FIG. 8K illustrating radially displaceable flanges disposed in a retracted position.

It is noted that FIGS. 8I-8K are similar to FIGS. 5A-5B (among others). Accordingly, for the sake of brevity, the discussion of FIGS. 8I-8I will tend to focus on differences of FIGS. 8I-8K with respect to FIGS. 5A-5B.

An exterior surface of back wall 822 (relative to the other side thereof against which is disposed, e.g., abuts, the back side of mobile device 10) includes a third connector 842 that has an exposed third electrode set corresponding to second electrode set 840 (not illustrated in FIGS. 8I-8K), respectively. FIG. 8B also illustrates a partial cross-section of a fourth connector 846 that that has an exposed fourth electrode set corresponding to the third electrode set of third connector 842, respectively. Third connector 842 and fourth connector 846 are configured to removably engage each other. For example, third connector 842 and fourth connector 846 comprise attachment assembly 850 that has similarities with respect to attachment assembly 550A such that third connector 842 and fourth connector 846 has similarities with respect to case attachment structure 860 and mount attachment structure 870, respectively, of FIGS. 2-3.

In FIGS. 8I-8K, case attachment structure 860 is a receptacle that includes a base plate 855A into which is formed a recess 865A, with recess 865A being defined by an inner surface of one or more side walls 855B and a bottom wall 855C (whose central region, at least, is substantially planar). For example, recess 865A can be cylindrical. A flange 855D extends inward (towards recess 865A) from the distal end of side walls 855B such that a groove 865B is defined between flange 855D and bottom wall 855C. For example, groove 865B can be annular. Also, for example, flange 855D may be a continuous annulus or may be formed of discrete annular segments.

Mount attachment structure 870 includes a base plate 854, a core member (or projection) 861 and an LP (again, locking and/or positioning) assembly 852. Core member 861 projects from base plate 854 into recess 865A. Phrased differently, portions of base plate 854 that extend radially (relative to a long axis of core member 861, which is substantially perpendicular to base plate 854) beyond sidewalls of core member 861 can be described as forming a flange at the proximal end of core member 861. The distal end of core member 861 is substantially planar.

LP assembly 852 includes a substantially coplanar back plates 872A1 and 872A2 (disposed substantially parallel to base plate 854), side walls 872B1 and 872B2 (extending substantially perpendicularly from back plates 872A1 and 782A2) and flanges 872C1 and 872C2 (extending substantially perpendicularly from side walls 872B1 and 872B2, respectively. For example, flanges 872C1 and 872C2 may be implemented as one or more annular segments. Flanges 872C1 and 872C2 extend from the distal end of core member 861 such that grooves 872D1 and 872D2 are defined between flanges 872C1 and 872C2 and back plates 872A1 and 872A2 flange 62, respectively.

Relative to a long axis of core member 861, LP assembly 852 can be configured to be radially displaceable. For example, a diameter of recess 865A (of case attachment structure 860, defined between end surfaces of flanges 855D) and a diameter of recess 865A plus a depth (in radial direction relative to the long axis of core member 861) of groove 865A (of case attachment structure 860) can be selected so that when mount attachment structure 870 is disposed onto case attachment structure 860, core member 861 becomes inserted into recess 865A, and more particularly side walls of core member 861 are disposed in close proximity to (if not in abutment with) end surfaces of flange 855, respectively. Such abutment, e.g., promotes contact therebetween but would not induce enough friction so as to substantially impede, if not prevent, insertion and removal of core member 861 to and from recess 865A. To further promote such contact, e.g., the outer surfaces of the side walls of core member 861 and the end surfaces of flange 855 can be correspondingly parallely chamfered.

By contrast, when side wall 872B1 & flange 872C1 and side wall 872B2 & flange 872C2 are disposed radially towards the long axis of core member 861 (e.g., via manipulation of back plates 872A1 and 872A2 in the directions shown by arrows A4 and A5 in FIG. 8K), eventually a state of flange retraction is achieved in which the distal ends of flanges 872C1 and 872C2 are radially nearer from the long axis of core member 861 than are the distal ends of flange 855D, thereby permitting core member 861 (of mount attachment structure 870) to be inserted into or removed from recess 865A of case attachment structure 860. For example, to promote such insertion, the neighboring surfaces end(s) of flanges 872C1 & 872C2 and flange 855D may be correspondingly parallely chamfered.

Returning to the discussion of insertion, at the culmination thereof, the distal planar end of core member 861 comes to abut bottom wall 855C. Then, side wall 872B1 & flange 872C1 and side wall 872B2 & flange 872C2 can be disposed radially away from the long axis of core member 861 (e.g., via manipulation of back plates 872A1 and 872A2 in the directions shown by arrows A2 and A3 in FIG. 8K), eventually achieving a state of cooperative fitting engagement in which flanges 872C1 and 872C2 are inserted into (i.e., engage) grooves 872D1 and 872D2, respectively.

For example, to promote such insertion, the distal end of core member 861 may be chamfered. Also for example, to promote achieving the state of cooperative fitting engagement, LP assembly 852 can be configured with a biasing assembly (not illustrated) that applies a biasing force, e.g., to back plates 872A1 and 872A2 radially towards the long axis of core member 861 (in the directions shown by arrows A2 and A3 in FIG. 8K), thereby biasing side wall 872B1 & flange 872C1 and side wall 872B2 & flange 872C2 towards their most radially outwardly extended position.

As a first effect, the cooperative fitting engagement mechanically resists disengagement of case attachment structure 860 from mount attachment structure 870. As a second effect, the abutting engagement of the side walls of core member 861 (of mount structure 870) with end surfaces of flanges 855 (of case attachment structure 860) mechanically stabilizes the alignment of mount structure 870 and case attachment structure 860 along the long axis of core member 861. Together, the first and second effects yield a third effect, namely a mechanical connection between case attachment structure 860 and mount structure 870, and thus between case 820 and mount 830.

Manipulation of back plates 872A1 and 872A2 of LP assembly 852, e.g., by applying forces to back plates 872A1 and 872A2 in directions radially inward/towards the long axis of core member 861 (in the directions shown by arrows A4 and A5 in FIG. 8K) may cause LP assembly 852 to at least temporarily disengage so that mount attachment structure 870 may be rotated (around/about the long axis of core member 861) or repositioned within recess 865A, as desired. Removing such a radially inward force permits LA assembly 50 to be returned to the state of cooperative fitting engagement (described above).

It should be noted, however, and as described herein, the present invention is not limited to the particular details of core attachment structure 860 and mount attachment structure 870 illustrated in FIGS. 8I-8K. Accordingly, other attachment and/or locking assemblies may be implemented within the full spirit and scope of the various embodiments of the present invention.

Furthermore, as at least some of mounts (e.g., 830, described herein) may be electrically connected with corresponding cases, (e.g., 820, described herein), mobile device 10 may be charged (or otherwise receive power) and/or make a data connection via case 820 (and more particularly case attachment structure 860) and mount 830 (and more particularly mount attachment structure 870). In FIGS. 8I-8K, for example, mount attachment structure 870 of mount 830 may be electrically connected to a power port 833 (not illustrated in FIGS. 8I-8K, into which can be plugged a removable cable 840 (not illustrated in FIGS. 8i-8K)) and/or a dedicated power cable 842 (not illustrated in FIGS. 8I-8K)), thereby allowing power to be received by mobile device 10 from an external power supply (not illustrated in FIGS. 8I-8K) through dedicated power cable 842 and mount attachment structure 870, and/or through removable cable 840 and port 833 and mount attachment structure 870, and/or data to be exchanged between mobile device 10 and an external device (not illustrated in FIGS. 8I-8K) via removable 840 and port 833 and mount attachment structure 870. It should be noted that the electrical connections between mount attachment structure 870, cable 842, cable 840 and port 833 may be provided via one or more leads (not illustrated in FIGS. 8I-8K) disposed therebetween, respectively, and contained in mount 830.

To facilitate the making of electrical connections between at least some of mounts 830 and case 820, attachment assembly 850 (more particularly, case attachment structure 860 and mount attachment structure 870) include cooperatively structured and arranged electrodes. For example, case attachment structure 860 can be provided with electrodes 853A, 853B, 853C, 853D and 853E, and mount attachment structure 870 can be provided with corresponding (e.g., cooperatively structured and arranged) electrodes 857A, 857B, 857C, 857D and 857E, respectively. Such electrodes can be formed, e.g., of electrically conductive material, such as metal or other materials.

In terms of electrodes for case attachment structure 860, in FIGS. 8I-8K, attached to, e.g., formed in, back wall 855C are electrodes 853A, 853B, 853C and 853E, which are arranged to be exposed at the planar surface of back wall 855C. Each of electrodes 853A, 853C and 853E can be a pin type of electrode distributed radially with respect to the long axis of core member 861. Electrode 853B can be an annular electrode centered substantially about the long axis of core member 861. Also in FIGS. 8I-8K, attached to, e.g., formed in, flange 855D are electrodes 853D. Electrodes 853D can be annular segment electrodes centered substantially about the long axis of core member 861.

In terms of electrodes for mount attachment structure 870, in FIGS. 8I-8K, attached to, e.g., formed in, the distal end of core member 861 are electrodes 857A, 857B, 857C and 857E, which are arranged to be exposed at the planar surface of the distal end of core member 861. Each of electrodes 857A, 857B and 857D can be a pin type of electrode distributed radially with respect to the long axis of core member 861. Also in FIGS. 8I-8K, attached to, e.g., formed in, base plate 854 are electrodes 857D. Each of electrodes 857C and 857E can be annular electrodes centered substantially about the long axis of core member 861.

Pin-type electrodes 857A, 857B and 857D are sized and located so as to align with electrodes 853A, 853B and 853D, respectively, when mount attachment structure 870 and case attachment structure 860 are in the state of cooperative fitting engagement. Similarly, annular electrodes 857C and 857E are sized and located so as to align with electrodes 853E and 853C, respectively, when mount attachment structure 870 and case attachment structure 860 are in the state of cooperative fitting engagement.

As noted, case attachment structure 860 and mount structure 870 mechanically connect case 820 and mount 830. Also as noted, electrodes in case attachment structure 860 and mount structure 870 electrically connect case 820 and mount 830. As such, attachment assembly 850 (which is comprised by case attachment structure 860 and mount structure 870) provides integrated mechanical and electrical connections between case 820 and mount 830. In other words, the electrical connections between case 820 and mount 830 (namely, the electrical connections made by attachment assembly 850) are integrated with the mechanical connections between case 820 and mount 830 (namely, the mechanical connections made by attachment assembly 850).

FIGS. 8L-8N illustrate additional views in accordance with at least the embodiment of FIGS. 8A-8K, with FIG. 8L being an exploded bottom end elevation view of the system, FIG. 8M illustrating an exploded side elevation view of the system; and FIG. 8N (case 820 and mobile device 10 not illustrated) being an alternative left elevation view with respect to FIG. 8D.

FIGS. 8O-8U illustrate additional views (mount 830 not illustrated) in accordance with at least the embodiment of FIGS. 8A-8N, with FIGS. 8O and 8U being first and second perspective rear views, respectively, FIG. 8T being a bottom plan view, FIGS. 8P and 8R being left and right elevation views, respectively, and FIGS. 8Q and 8S being bottom and top elevation views, respectively, of mobile device 10 contained in case 820.

FIGS. 9A-9G illustrate views (case 920 and mobile device 10 not illustrated) in accordance with at least one other embodiment of the present invention, with FIGS. 9B and 9G being first and second perspective views, respectively, FIG. 9D being a top plan view, FIGS. 9C and 9E being left and right elevation side views, respectively, and FIGS. 9A and 9G being front and back elevation views, respectively, of another system for mechanically and electrically connecting mobile device case 920 (not illustrated) to a mount 970, e.g., compatible with the system of FIGS. 8A-8U.

In FIGS. 9A-9G, mount 970 is adapted to include not only a mount attachment structure 970, but also a band assembly 991, e.g., a wrist band assembly or an arm band assembly. Alternatively, mount 970 could be adapted to be a bicycle mount, e.g., by replacing band assembly 991 with a clamp assembly, e.g., clamp assembly 1201 of FIG. 12 (discussed below).

Figure 9I:
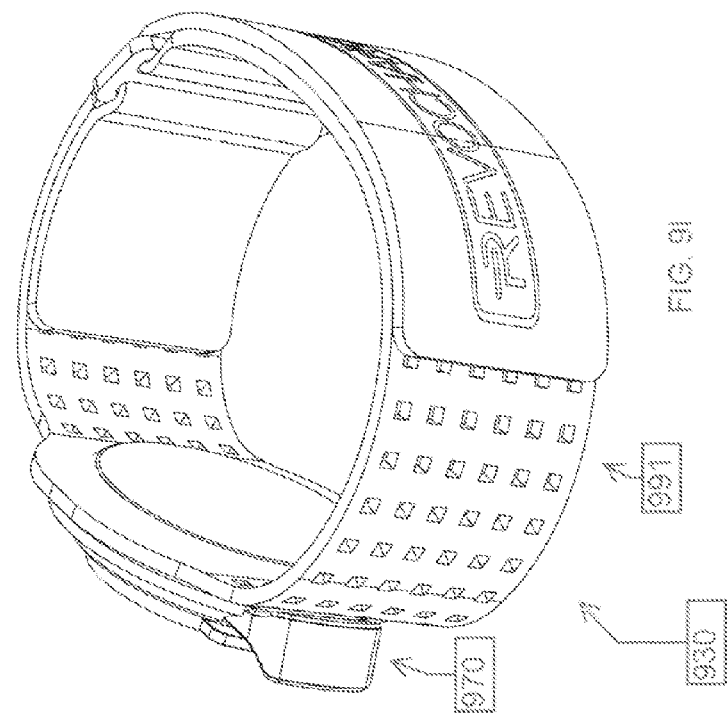
FIGS. 9H-9I illustrate additional views (case and mobile device not illustrated) of the mount in accordance with at least the embodiment of FIGS. 9A-9G, with FIGS. 9H and 9I being third and fourth perspective views, respectively.
Figure 9H:
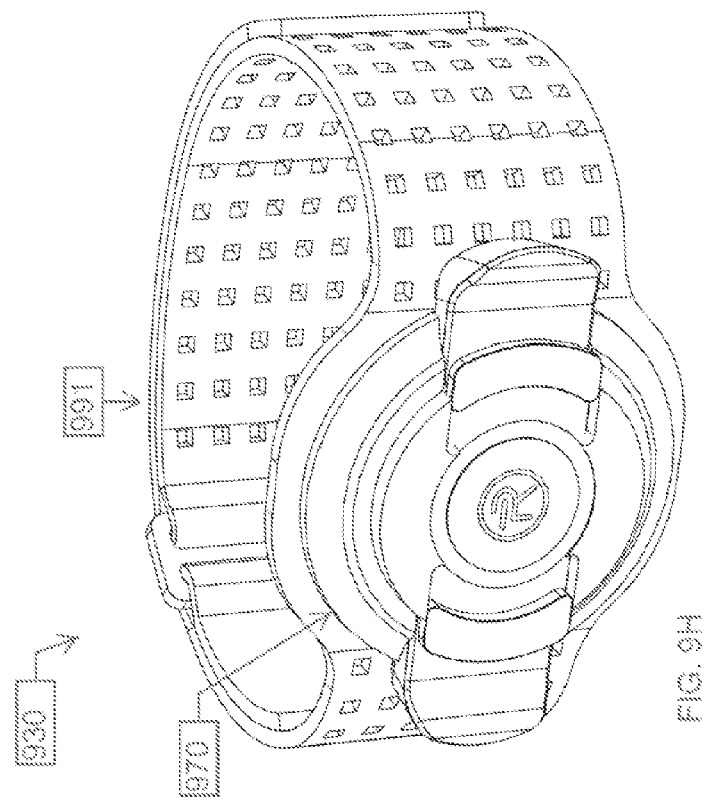

FIGS. 9H-9I illustrate additional views (case 920 and mobile device 10 not illustrated) of mount 930 in accordance with at least the embodiment of FIGS. 9A-9G, with FIGS. 9H and 9I being third and fourth perspective views, respectively;

FIGS. 9J-9K illustrate additional views (case 920 and mobile device 10 being illustrated) in accordance with at least the embodiment of FIGS. 9A-9I, with FIG. 9J being an exploded bottom end elevation view of the system, and FIG. 9K being an exploded side elevation view of the system.

As between FIGS. 9J-9K, in FIG. 9K, case 920 is rotated 90 degrees with respect to the orientation of case 920 in FIG. 9J. Together, FIGS. 9J-9K illustrate that mount attachment structure 970 and case attachment structure 960 are configured to facilitate achieving different orientations of case 920 with respect to mount 930. With respect to FIGS. 8A-8U discussed above, is it noted that mount attachment structure 870 and case attachment structure 860 are similarly configured to facilitate achieving different orientations of case 820 with respect to mount 830.

Figure 10C:
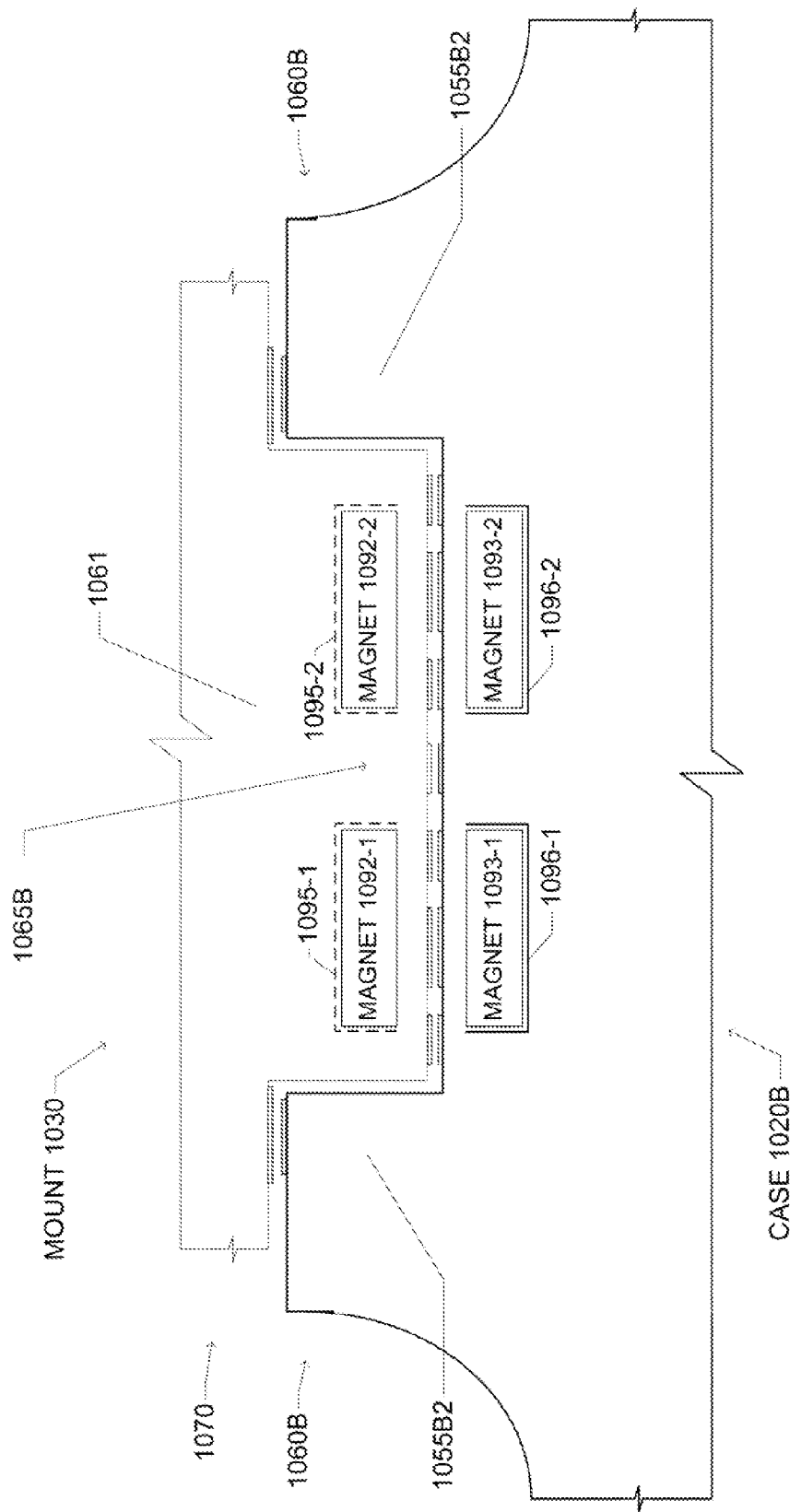

FIGS. 10A-10C illustrate views in accordance with at least one other embodiment of the present invention, with FIG. 10A being a simple cross-section of a mobile device and another case, with FIGS. 10B-10C illustrating partial cross-sections of another system for magneto-mechanically and electrically connecting a mobile device case 1020A and 1020B, respectively, to a mount 1030 (not illustrated in FIGS. 10A-10C) as well as an external device 1094 (not illustrated in FIGS. 10A-10C) to cases 1020A-1020B and/or mount 1030 (not illustrated in FIGS. 10A-10C), with FIGS. 10A-10C more particularly illustrating first and second attachment assemblies 1050A and 1050B of the system, respectively.

It is noted that FIGS. 10A-10B are similar to FIGS. 8J-8K (among others). Accordingly, for the sake of brevity, the discussion of FIGS. 10A-10B will tend to focus on differences of FIGS. 10A-10B with respect to FIGS. 8J-8K.

Whereas mount attachment structure 870 of FIGS. 8J-8K includes a base plate 854, a core member (or projection) 861 and an LP (again, locking and/or positioning) assembly 852, mount attachment structure 1070 of FIGS. 10A-10B does not include an LP assembly. Instead, mount attachment structure 1070 includes magnets 1092-1 and 1092-2 and/or case attachment structure 1060A includes magnets 1093-1 and 1093-2.

Magnets 1092-1 and 1092-2 and magnets 1093-1 and 1093-2 can be permanent magnets or electromagnets. If electromagnets are used, then power can be supplied via mobile device 10 or via a battery 1006 disposed in case 1020A. Furthermore, if electromagnets are used, then a switch 1007 can be provided to selectively de-energize the electromagnets (interrupt the flow of current thereto) and consequently terminate the electromagnetic fields, thereby facilitating disengagement of case attachment structure 1060A from mount attachment structure 1070. In FIG. 10A, battery 1006 and switch 1007 are enclosed in a dashed box to denote that they are optional.

For example, magnets 1092-1 and 1092-2 and magnets 1093-1 and 1093-2 can exhibit static or slowly varying magnetic fields. Alternatively, one of magnets 1092-1 and 1092-2 and magnets 1093-1 and 1093-2 may instead be a ferrous material to achieve the same effect. Magnets 1092-1 and 1092-2, magnets 1093-1 and 1093-2 (or alternatively ferrous material) may also be incorporated into any of the other mount embodiments disclosed.

In FIGS. 10A-10B, magnets 1092-1 and 1092-2 are disposed in core member 1061 near the distal end thereof. Correspondingly, magnets 1093-1 and 1093-2 are disposed in bottom wall 1055C near the surface thereof. Magnets 1092-1 and 1092-2 are sized, located and configured so that their magnetic fields generates magnetic forces that attracts magnets 1093-1 and 1093-2, which thereby draws core member 1061 towards bottom wall 1055C. Correspondingly, magnets 1093-1 and 1093-2 are sized, located and configured so that there magnetic fields generate magnetic forces that attract magnets 1092-1 and 1092-2, which thereby draws bottom wall 1055C towards core member 1061.

For example, there can be four magnets 1092-1, 102-2, 1092-3 (not illustrated) and 1092-4 (not illustrated) and a corresponding four magnets 1093-1, 102-2, 1092-3 (not illustrated) and 1092-4 (not illustrated), respectively. Such magnets can be arranged (in a top plan view (not illustrated)) at 90 degree intervals around the X-Y plane of a three-dimensional Cartesian coordinate system, e.g., with magnets 1092-1 and 1093-1 at zero degrees, magnets 1092-2 and 1093-2 at 90 degrees, magnets 1092-3 and 1093-3 at 180 degrees, and magnets 1092-4 and 1093-4 at 270 degrees. When case attachment structure 1060A and mount attachment structure 1070 are oriented so as to be parallel with the X-Y plane of the three-dimensional Cartesian coordinate system, and case attachment structure 1060A is rotated relative to mount attachment structure 1070 about the Z-axis of the three-dimensional Cartesian coordinate system, such multiple interacting magnetic fields can urge case attachment structure 1060A to assume orientations at 90 degree intervals in the X-Y plane with respect to mount attachment structure 1070, i.e., multiple magnetic fields cooperatively interact as magnetic detents relative to orientations of case attachment structure 1060A in the X-Y plane with respect to mount attachment structure 1070.

Magnetic field shields 1096-1 and 1096-2 can be provided around, e.g., three sides of, magnets 1093-1 and 1093-2, respectively, to reduce the portion of the magnetic fields from magnets 1093-1 and 1093-2 to which mobile device 10 is subjected. Optionally and correspondingly, magnetic field shields 1095-1 and 1095-2 can be provided around, e.g., three sides of, magnets 1092-1 and 1092-2, respectively, to reduce the portion of the magnetic field from magnets 1092-1 and 1092-2 extending in a direction leading away from magnets 1093-1 and 1093-2. Static or slowly varying magnetic fields, such as that exhibited by magnet 1093-1 and 1093-2, can be selectively diverted/redirected by the shape of shields 1096-1 and 1096-2, the thickness of the walls of shields 1096-1 and 1096-2 and the material from which shields 1096-1 and 1096-2 are made. For example, shields 1096-1 and 1096-2 can be formed from a ferromagnetic metal, e.g., iron, steel, mu-metal, a super conductor, etc.

Such magnetic forces, e.g., promotes abutment between: the distal end of core member 1061 (and more particularly the electrodes formed therein) and the surface of bottom wall 1055C (and more particularly the electrodes formed therein); and between the surface of base plate 1054 (and more particularly the electrodes formed therein) and flange 1055 (and more particularly the electrodes formed therein). But such magnetic forces would not be so large as to substantially impede, if not prevent, removal of core member 1061 from recess 1065A.

As a first effect, such magnetic forces electromagnetically resist disengagement of case attachment structure 1060A from mount attachment structure 1070. As a second effect, the abutting engagement of the side walls of core member 1061 (of mount structure 1070) with end surfaces of flange 1055D (of case attachment structure 1060A) mechanically stabilizes the alignment of mount structure 1070 and case attachment structure 1060A along the long axis of core member 1061. Together, the first and second effects yield a third effect, namely a magneto-mechanical connection between case attachment structure 1060A and mount structure 1070, and thus between case 1020 and mount 1030. In other words, the electrical connections between case 1020 and mount 1030 (namely, the electrical connections made by attachment assembly 1050) are integrated with the magneto-mechanical connections between case 1020 and mount 1030 (namely, the magneto-mechanical connections made by attachment assembly 1050).

In implementations, the magnetic attachment mechanism disclosed may be easier to initiate and release than the purely mechanical mechanisms disclosed in other embodiments, but also may provide a less secure connection, particularly when lateral/rotational forces are applied. This may make the magnetic attachment mechanism most desirable for applications where convenience of attachment and release are at a premium relative to a secure connection—for example it may be more desirable for use in a desk mount than an arm band, and/or may be more or less desirable based on the preferences and pattern of use of particular users.

It is noted that FIG. 10C is similar to FIG. 10B (among others). Accordingly, for the sake of brevity, the discussion of FIG. 10C will tend to focus on differences of FIG. 10C with respect to FIG. 10B.

Whereas case attachment structure 1060A (of FIG. 10B) includes flange 1055D (extending inwardly from sidewalls 1055B1) and consequently has groove 1065B, case attachment structure 1060B is not provided with a flange 1055D. Hence, case attachment structure 1060B does not have a groove corresponding to groove 1065B. As a result, the interior surface area of side walls 1055B2) abuttingly engages the side wall of core member 1061. In contrast to the amount of surface area at the end of flange 1055D (of case attachment structure 1060A) in abutting engagement with the side wall of core member 1061 in FIG. 10B, there is a greater amount of surface area of side walls 1055B2 (of case attachment structure 1060B) in abutting engagement with the side wall of core member 1061 in FIG. 10C), which promotes relatively greater mechanical stabilization of the alignment of mount structure 1070 and case attachment structure 1060B along the long axis of core member 1061.

Figure 10D:
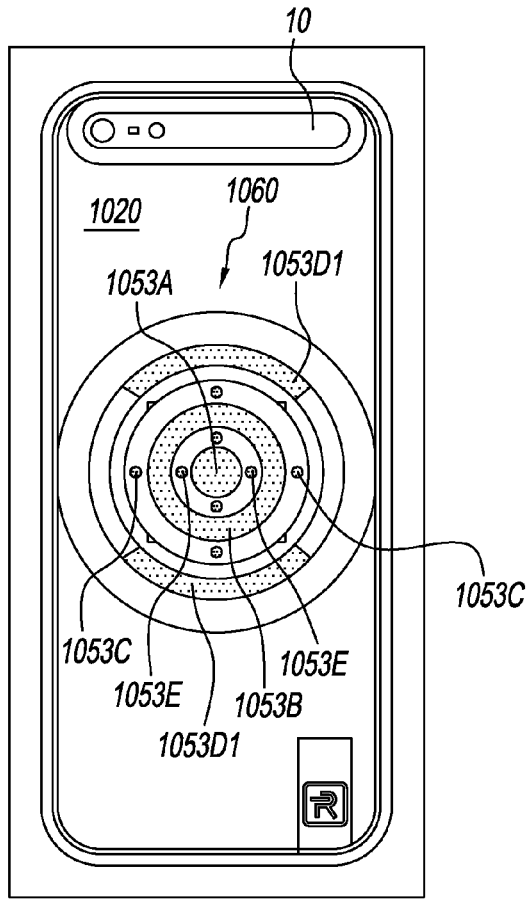
FIG. 10D illustrates a back plan view of the cases of FIGS. 10A-10C, and more particularly the case attachment structures thereof.
Figure 10E:
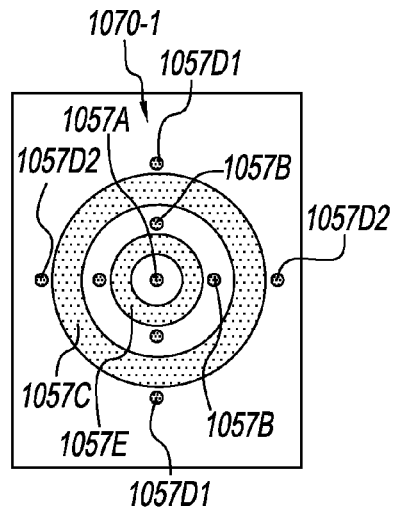
FIG. 10E illustrates a back plan view of a mount attachment structure (of an external device) corresponding to the case attachment structure of FIG. 1 OD.

FIG. 10D illustrates a back plan view of case 1020 of FIGS. 10A-10C, and more particularly case attachment structure 1060. FIG. 10E illustrates a back plan view of a mount attachment structure 1070-1 of an external device 1060. And FIG.

10F illustrates a back plan view of a mount attachment structure 1070-2 of a mount 1075 for external device 1094.

To facilitate the making of electrical connections between at least some of mounts 1030 and case 1020, attachment assembly 1050 (not called out in FIGS. 10d-10F) (more particularly, case attachment structure 1060 and mount attachment structure 1070-1 or case attachment structure 1060 and mount attachment structure 1070-1) include cooperatively structured and arranged electrodes. For example, case attachment structure 1060 can be provided with electrodes 1053A, 1053B, 1053C, 1053D1 and 1053E, mount attachment structure 1070-1 can be provided with corresponding (e.g., cooperatively structured and arranged) electrodes 1057A, 1057B, 1057C, 1057D and 1057E, and mount attachment structure 1070-2 can be provided with corresponding (e.g., cooperatively structured and arranged) electrodes 1057A, 1057B, 1057C, 1057D2 and 1057E, respectively. Such electrodes can be formed, e.g., of electrically conductive material, such as metal or other materials.

In terms of electrodes for case attachment structure 1060, in FIG. D, attached to, e.g., formed in, back wall 1055C (not called out in FIG. 10D) are electrodes 1053A, 1053B, 1053C and 1053E, which are arranged to be exposed at the planar surface of back wall 1055C. Each of electrodes 1053A, 1053C and 1053E can be a pin type of electrode distributed radially with respect to the long axis of core member 1061 (not called out in FIG. 10D). Electrode 1053B can be an annular electrode centered substantially about the long axis of core member 1061 (again, not called out in FIG. 10D). Electrodes 1053D1 can be annular segment electrodes centered substantially about the long axis of core member 1061 (again, not called out in FIG. 10D).

In terms of electrodes for mount attachment structure 1070-1 of external device 1094 in FIG. 10E, attached to, e.g., formed in, the distal end of core member 1061 (not called out in FIG. 10E) are electrodes 1057A, 1057B, 1057C and 1057E, which are arranged to be exposed at the planar surface of the distal end of core member 1061 (again, not called out in FIG. 10E). Each of electrodes 1057A, 1057B and 1057D can be a pin type of electrode distributed radially with respect to the long axis of core member 1061 (not called out in FIG. 10E). Each of electrodes 1057C and 1057E can be annular electrodes centered substantially about the long axis of core member 1061 (again, not called out in FIG. 10E).

Figure 10F:
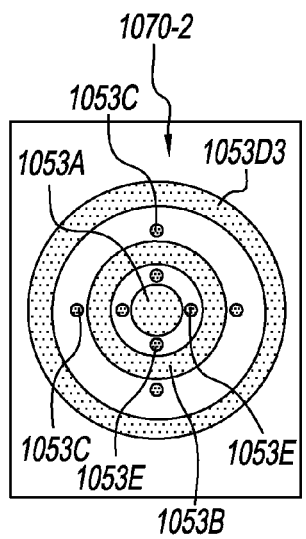
FIG. 10F illustrates a back plan view of a mount attachment structure (for the external device of FIG. 10E) corresponding to the case attachment structure of FIG. 10D.

In terms of electrodes for mount attachment structure 1070-2 of mount 1075 in FIG. 10F, attached to, e.g., formed in, back wall 1055C (not called out in FIG. 10D) are electrodes 1053A, 1053B, 1053C and 1053E, which are arranged to be exposed at the planar surface of back wall 1055C (again, not called out in FIG. 10D). Each of electrodes 1053A, 1053C and 1053E can be a pin type of electrode distributed radially with respect to the long axis of core member 1061 (not called out in FIG. 10D). Electrodes 1053B and 1053D3 can be annular electrodes centered substantially about the long axis of core member 1061 (again, not called out in FIG. 10D).

For example, when external device 1094 is attached to case 1020, pins 1057D2 of mount attachment structure 1070-1 will not contact electrodes 1053D1 of case attachment structure 1060. Under such circumstances, if external device 1094 is, e.g., a battery, then the battery will discharge so as to provide power to mobile device 10. By contrast, when external device 1094 is attached to mount 1075, pins 1057D2 of mount attachment structure 1070-1 will contact electrode 1053D3 of mount attachment structure 1070-2. Under the latter circumstance, if external device 1094 is, e.g., a battery, then the battery will not discharge.

FIGS. 10G-10I illustrate additional views in accordance with at least the embodiment of FIGS. 10A-10F, with FIG. 10G being an exploded three-quarter front perspective view of the system (external device 1094 not illustrated), FIG. 10H being an unexploded three-quarter rear perspective view of the system (external device 1094 not illustrated), and FIG. 10I being an exploded three-quarter rear perspective view of the system (case 1020A, 1020B and mobile device 10 not illustrated).

For example, external device 1094 can be a mobile battery. Alternatively, external device 1094 can be a mobile magnetic card reader (for reading magnetic stripe cards, e.g., credit cards), a mobile smart card or chip card or ICC (integrated circuit card) reader (for reading cards, typically pocket-sized, that include embedded integrated circuits), an external storage device (e.g., a flash/thumb drive, memory card, etc.), an antenna (e.g., 802.11-type wireless local area network (WLAN) compatible, WiFi, mobile telephony, etc.), a lens system, a sensor, etc.

In FIGS. 10E-10F, mount 1030A is a gravity mount, e.g., a desk mount, and is provided not only with a first mount attachment structure 1070A, but also with a second mount attachment structure 1070B located on base 1031. External device 1094, e.g., a battery, is provided with a case attachment structure, e.g., case attachment 1060A or case attachment structure 1060B. As such, external device 1094 can engage second mount attachment structure 1070B via magneto-mechanical connections and electrical connections, e.g., to thereby supply power (or, in other words, charge) external voltage source 1094, without or without case 1020A, 1020B being engaged with first mount 107A. If both external device 1094 and case 1020A, 1020B are engaged, power can be supplied to external device 1094 while power and/or data are supplied to case 1020A, 1020B.

FIGS. 10J-10K illustrate additional views in accordance with at least the embodiment of FIGS. 10A-10I, with FIG. 10J being an exploded three-quarter perspective front view of case 1020A, 1020B, mobile device 10 and an alternate mount 1030B, and with FIG. 10K being an unexploded three-quarter perspective rear view of case 1020A, 1020B, mobile device 10 and alternate mount 1030B.

In FIGS. 10J-10K, mount 1030A is a suction mount, e.g., a window mount.

FIGS. 10L-10N illustrate additional views in accordance with at least the embodiment of FIGS. 10A-10K, with FIG. 10L being an unexploded three-quarter perspective front view of case 1020A, 1020B, mobile device 10 and external power source 1094 (mounts 1030A and 1030 not illustrated), with FIG. 10M being an unexploded three-quarter perspective rear view of case 1020A, 1020B, mobile device 10 and external power source 1094 (mounts 1030A and 1030B not illustrated), and FIG. 10N being an exploded three-quarter perspective front view of case 1020A, 1020B, mobile device 10 and external power source 10940 (mounts 1030A and 1030B not illustrated).

Figure 11A:
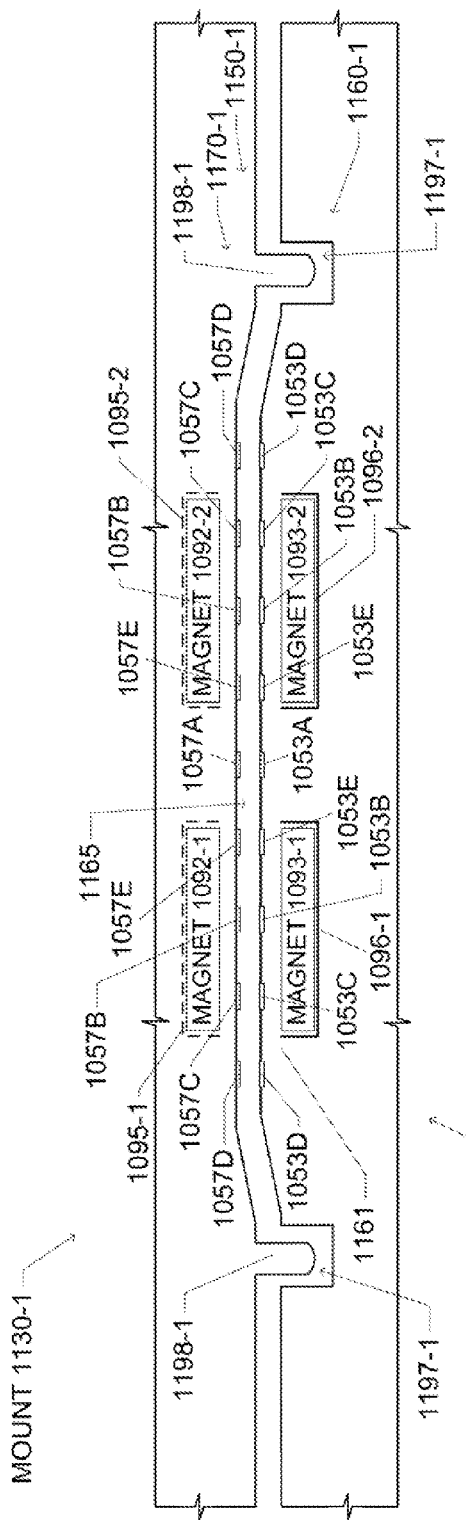
FIGS. 11A-11B illustrates partial cross-sections of another system for magneto-mechanically and electrically connecting a mobile device case to mounts (mobile device not illustrated), in accordance with at least one other embodiment of the present invention.
Figure 11B:
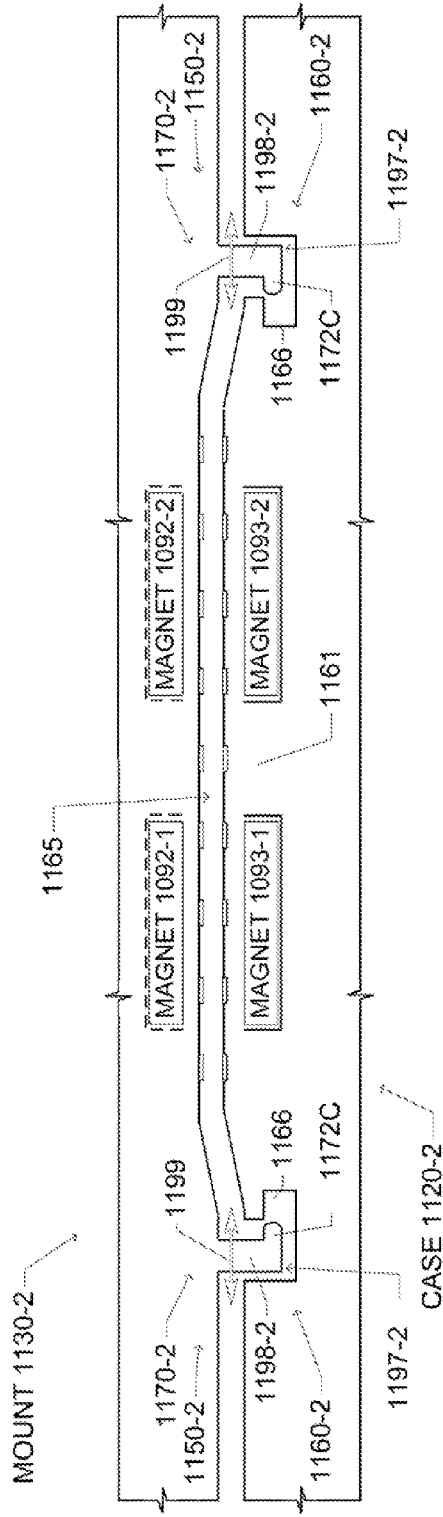

FIGS. 11A-11B illustrates partial cross-sections of another system for magneto-mechanically and electrically connecting a mobile device case 1120 to a mount 1130-1 (FIG. 11A) and a mount 1130-2 (FIG. 11B), in accordance with at least one other embodiment of the present invention.

It is noted that FIG. 11A is similar to FIG. 10C (among others). Accordingly, for the sake of brevity, the discussion of FIG. 11A will tend to focus on differences of FIG. 11A with respect to FIG. 10C.

Whereas mount attachment structure 1070 of FIG. 10 includes projecting core member 1061 and case attachment structure 1060B has formed therein recess 1065B, by contrast, mount attachment structures 1170-1 and 1170-2 have formed therein a recess 1165 and case attachment structures 1160-1 and 1160-2 include a corresponding projecting core member 1161. It is noted that recess 1165 is substantially shallower than recess 1065B, and core member 1161 correspondingly projects outward substantially less than core member 1061. Projecting core member 1161 tapers from its proximal to its distal end, i.e., is wider at its proximal end that at its distal end. Correspondingly, recess 1165 tapers from its top to its bottom, i.e., the mouth of recess 1165 is wider than the bottom of recess 1065. The distal end of projecting core member 1161 and the bottom of recess 1165 are substantially planar and, e.g., circular in cross-section.

In FIG. 11A, at the lateral edges of core member 1161, there are annular groove segments 1197 formed into case attachment structure 1160-1. At the edges of recess 1165, tabs 1198-1 project from mount attachment structure 1060-1. Tabs 1198-1 are sized and shaped to removably engage groove segments 1197-1. When engaged in groove segments 1197-1, tabs 1198-1 resist lateral translation of mount attachment structure 1170-1 with respect to case attachment structure 1160-1.

As a first effect, the magnetic forces of magnets 1093-1 and 1093-2 and magnets 1092-1 and 1092-2 electromagnetically resist disengagement of case attachment structure 1160-1 from mount attachment structure 1170-1. As a second effect, the engagement of tabs 1198-1 (of mount attachment structure 1170-1) with groove segments 1197 (of case attachment structure 1160-1) mechanically stabilizes the alignment of mount structure 1170-1 and case attachment structure 1160-1 along the long axis of core member 1161 (which is substantially parallel to the planar surfaces to which the electrodes are attached). Together, the first and second effects yield a third effect, namely a magneto-mechanical connection between case attachment structure 1160-1 and mount structure 1170-1, and thus between case 1120-1 and mount 1130-1. In other words, the electrical connections between case 1120-1 and mount 1130-1 (namely, the electrical connections made by attachment assembly 1150-1) are integrated with the magneto-mechanical connections between case 1020-1 and mount 1030-1 (namely, the magneto-mechanical connections made by attachment assembly 1050-1).

It is noted that FIG. 11B is similar to FIG. 11A and FIGS. 8J-8K (among others). Accordingly, for the sake of brevity, the discussion of FIG. 11B will tend to focus on differences of FIG. 11B with respect to FIGS. 11A and 8J-8K.

In FIG. 11B, mount attachment structure 1170-2 is provided with tabs 1198-2 that are similar to tabs 1198-1 of FIG. 11A but additionally include flanges 117C that extend, e.g., substantially perpendicularly, from distal ends of flanges 1198-2. Correspondingly, case attachment structure 1160-2 is provided with annular groove segments 1197-2 that are similar to annular groove segments 1197-1 of FIG. 11A but additionally include annular alcoves 1166 that extend radially inward towards the long axis of core member 1161 (which is substantially parallel to the planar surfaces to which the electrodes are attached). Relative to the long axis of core member 1161, tabs 1198-2 can be configured to be radially displaceable (as indicated by double-headed arrows 1199), e.g., similar to LP assembly 852 of FIGS. 8J-8K. In contrast to LP assembly 852, when tabs 1198-2 are displaced radially inwardly, flanges 1172C can engage alcoves 1166, and when tabs 1198-2 are displaced radially outwardly, flanges 1172C can be disengaged from alcoves 1166.

It is noted that case 1120-2 (having case attachment structure 1160-02) not only can be used with mount 1130-2 (having mount attachment structure 1170-2), but also with mount 1130-1 (having mount attachment structure 1170-1).

As a first effect, the magnetic forces of magnets 1093-1 and 1093-2 and magnets 1092-1 and 1092-2 electromagnetically and the engagement of flanges 1172C with alcoves 1166 combine to resist disengagement of case attachment structure 1160-1 from mount attachment structure 1170-1. As a second effect, the engagement of tabs 1198-1 (of mount attachment structure 1170-1) with groove segments 1197 (of case attachment structure 1160-1) mechanically stabilizes the alignment of mount structure 1170-1 and case attachment structure 1160-1 along the long axis of core member 1161 (which is substantially parallel to the planar surfaces to which the electrodes are attached). Together, the first and second effects yield a third effect, namely a magneto-mechanical connection between case attachment structure 1160-1 and mount structure 1170-1, and thus between case 1120-1 and mount 1130-1. In other words, the electrical connections between case 1120-1 and mount 1130-1 (namely, the electrical connections made by attachment assembly 1150-1) are integrated with the magneto-mechanical connections between case 1020-1 and mount 1030-1 (namely, the magneto-mechanical connections made by attachment assembly 1050-1).

Figure 11F:
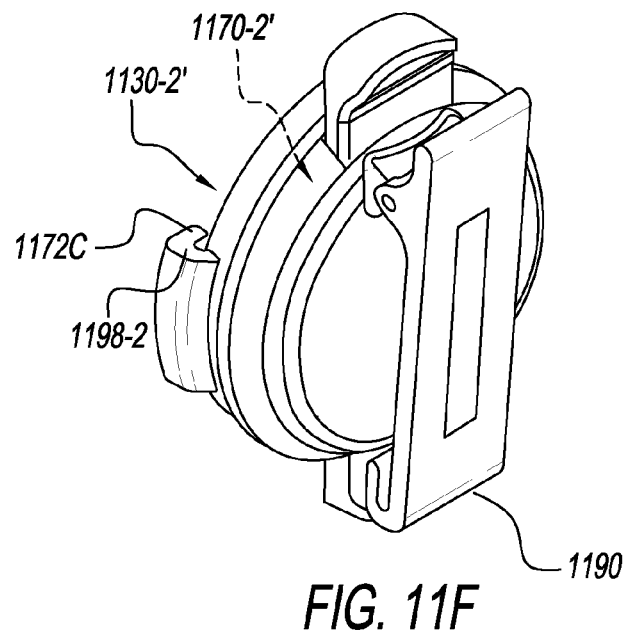
Figure 11G:
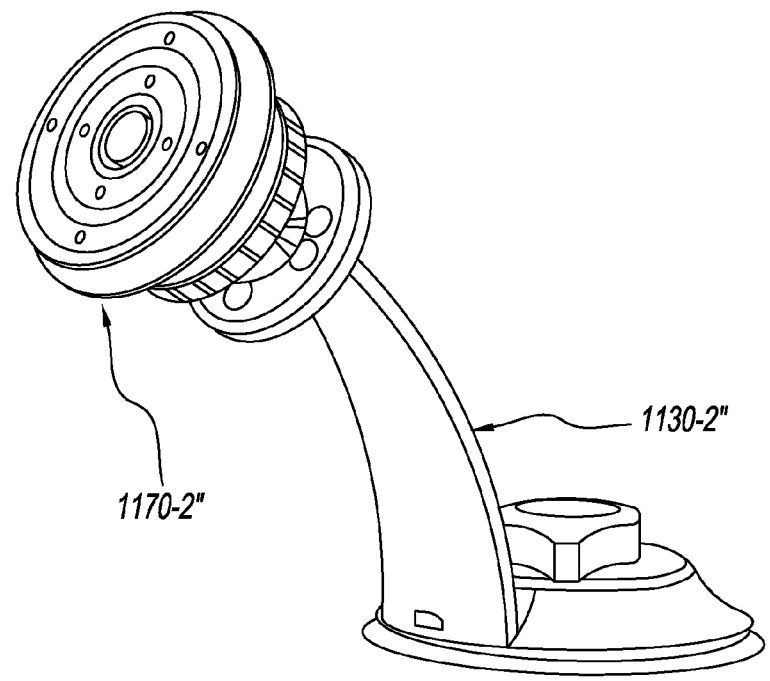
Figure 11H:
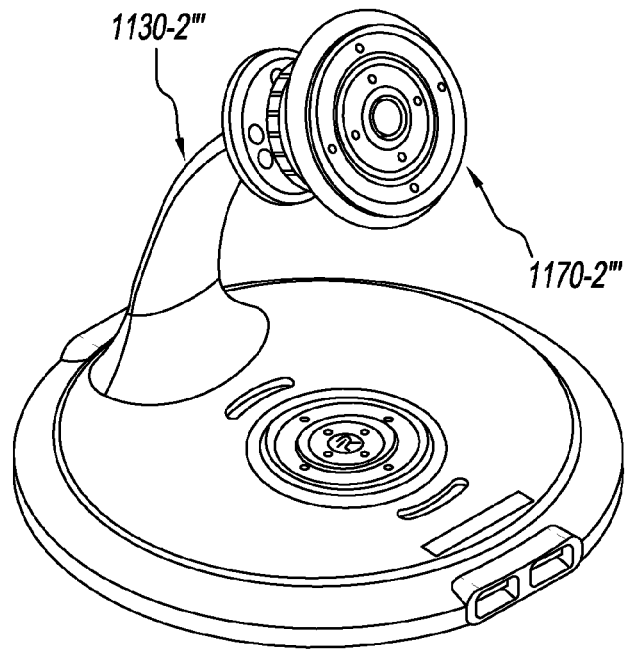
Figure 11I:
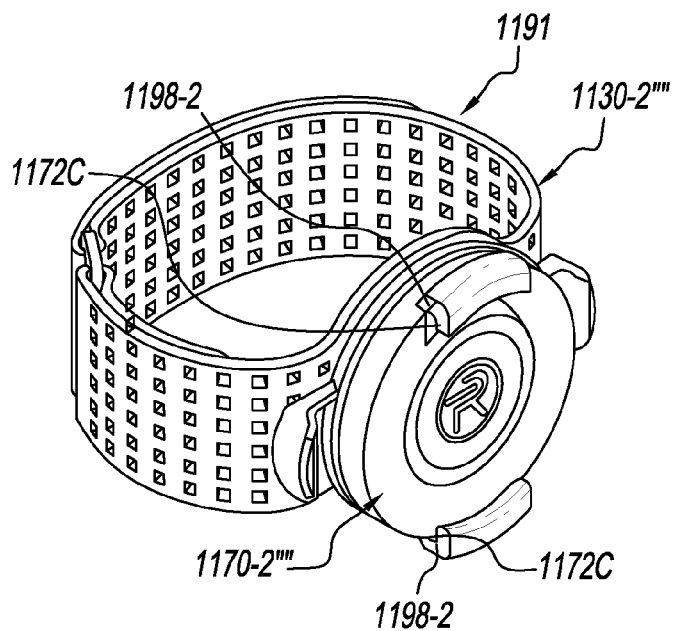

FIGS. 11C-11I illustrate additional views in accordance with at least the embodiments of FIGS. 11A-11B, with FIG. 11C being a perspective rear view of case 1120-2 and mobile device 10 contained therein (mount not illustrated), FIG. 11D being perspective rear view of an external device 1194 (mobile device, case and mount not illustrated), FIGS. 11E-11F being front and rear perspective views of a first version 1130-2' of mount 1130-2 (mobile device and case not illustrated), respectively, FIG. 11G being a front perspective view of a second version 1130-2'' of mount 1130-2 (mobile device and case not illustrated), FIG. 11H being a front perspective view of a third version 1130-2''' of mount 1130-2 (mobile device and case not illustrated), and FIG. 11I being a front perspective view of a fourth version 1130-2'''' of mount 1130-2 (mobile device and case not illustrated);

It is noted that FIGS. 11C-11I are similar to FIGS. 11A-11B (among others). Accordingly, for the sake of brevity, the discussion of FIGS. 11C-11I will tend to focus on differences of FIGS. 11C-11I with respect to FIGS. 11A-11B.

FIG. 11C illustrates, among other things, one of the advantages noted above. More particularly, FIG. 11C illustrates, among other things, that the location of case attachment structure 1160-2 in a central region on the back of case 1120-2 will facilitate unencumbered use of a headphone jack 1107 of mobile device 10 (e.g., by plugging in a headphone cable 1108) when case attachment structure 1120-2 is connected to mount attachment structures 1130-1, 1330-2, etc.

In FIG. 11D, external device 1194 includes, among other things, a first version 1170-1' of mount attachment structure 1170-1. Hence, FIG. 11D illustrates tabs 1198-1, whereas FIGS. 11E-11I illustrate tabs 1198-2.

In FIGS. 11E-11F, mount 1130-2' includes a first version 1170-2' of mount attachment structure 1170-2 and a clip assembly 1190, e.g., a belt clip assembly.

In FIG. 11G, mount 1130-2'' includes a second version 1170-2'' of mount attachment structure 1170-2. Mount 1130-2'' is adapted to be, for example, a suction mount, e.g., a window mount.

In FIG. 11H, mount 1130-2''' includes a third version 1170-2''' of mount attachment structure 1170-2. Mount 1130-2''' is adapted to be, for example, a gravity mount, e.g., a desk mount.

In FIG. 11I, mount 1130-2'''' includes a fourth version 1170-2'''' of mount attachment structure 1170-2 and a band assembly 1191, e.g., a wrist band assembly or an arm band assembly. Alternatively, mount 1130-2"" could be adapted to be a bicycle mount, e.g., by replacing band assembly 1191 with a clamp assembly, e.g., clamp assembly 1201 of FIG. 12 (discussed below).

Figure 12:
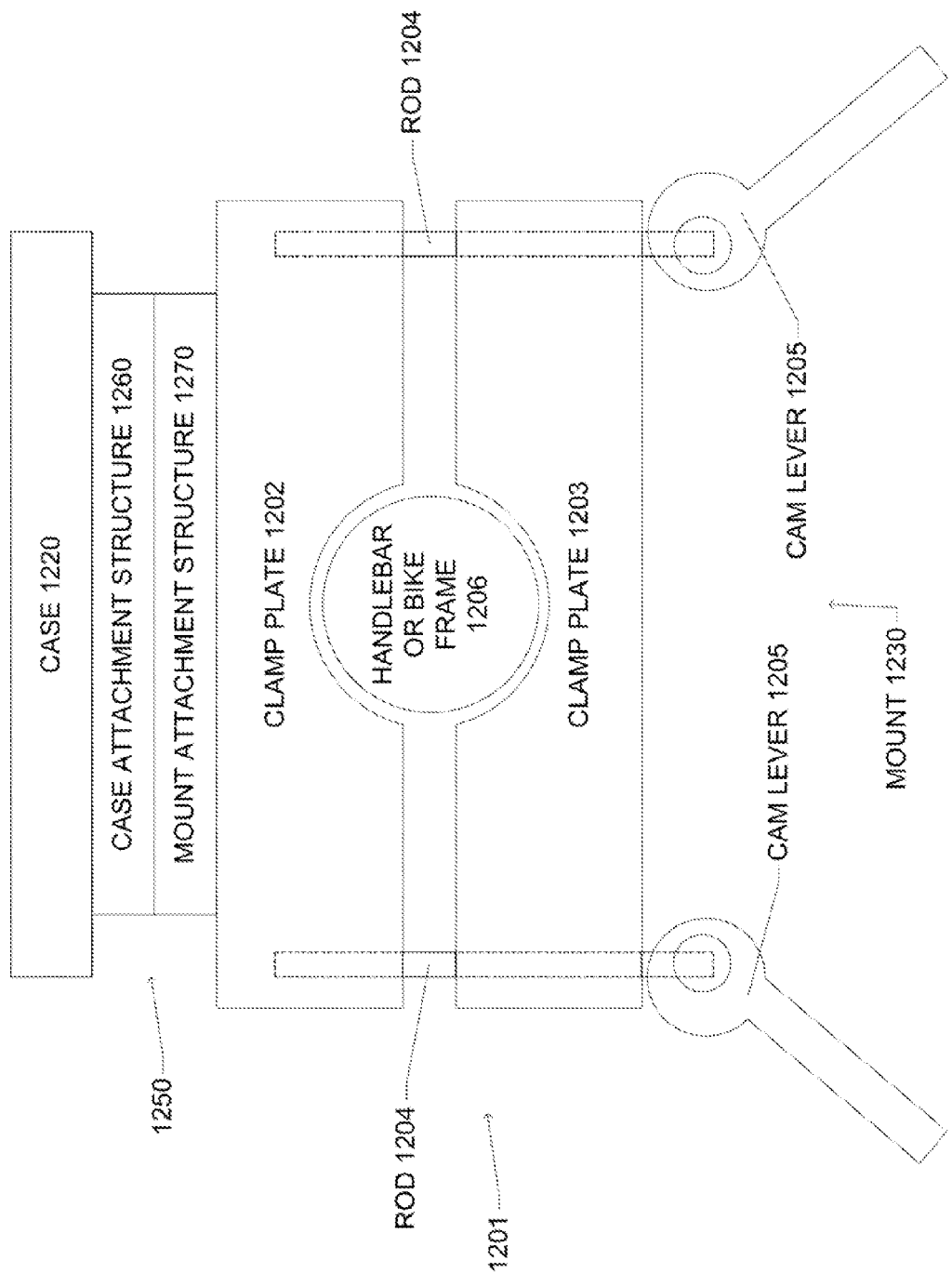
FIG. 12 illustrates a cross-section of another system for mechanically and electrically connecting a mobile device case to a mount, e.g., compatible with any of the mounting assemblies disclosed herein, in accordance with at least one other embodiment of the present invention.

FIG. 12 illustrates a cross-section of another system for mechanically and electrically connecting a mobile device case 1220 to a mount 1230, e.g., compatible with any of the mounting assemblies disclosed herein, in accordance with at least one other embodiment of the present invention.

In FIG. 12, case 1220 includes a case attachment structure 1260 and mount 1230 includes a mount attachment structure 1270. Together, case attachment structure 1260 and mount attachment structure 1270 comprise attachment assembly 1250. It is noted that case 1220, attachment assembly 1250 (and more particularly case attachment structure 1260 and mount attachment structure 1270) are similar to components described elsewhere in this document. Accordingly, for the sake of brevity, the discussion of FIG. 12 will tend to focus on the other components of FIG. 12.

Mount 1230 further includes a clamp assembly 1201. And clamp assembly 1201 includes clamp plate 1202, clamp plate 1203, rods 1204 and cam levers 1205. Mount 1230 can be used, e.g., to mount case 1220 to a bicycle. In such circumstances, clamp plates 1202 and 1203 can be disposed around a handlebar or a portion of the bicycle frame 1201. Rods 1204 attach to clamp plate 1202, e.g., clamp plate 1202 is provided with threaded blind holes that receive correspondingly threaded ends of rods 1204). Rods 1204 pass through clamp plate 1203 where they attach to cam levers 1205, respectively. Selective rotation of cam levers 1205 can apply forces against clamp plate 1203 in a direction urging clamp plate 1203 towards clamp plate 1202, thereby clamping handlebar/frame 1206 therebetween.

In another aspect of the present technology, there is provided a case for a mobile device that includes a first connector (e.g., a socket compatible with one of an APPLE® computer bus format and a Universal Serial Bus (USB) computer bus format) having an exposed first set of one or more electrodes. Such a case comprises: walls that define a recess configured to removably receive the mobile device at least partially; a second connector (e.g., a plug compatible with one of an APPLE® computer bus format and a Universal Serial Bus (USB) computer bus format), attached to at least one of the walls so as to be exposed to the recess, configured to removably engage the first connector, and having an exposed second electrode set corresponding to the first set, respectively; a third connector, attached to an exterior surface of one or more of the walls (e.g., a socket compatible with one of an APPLE® computer bus format and a Universal Serial Bus (USB) computer bus format, or a case attachment structure as disclosed herein, e.g., case attachment structure 1160-1, 1160-2, etc.), configured to be removably engageable with a fourth connector (e.g., a plug compatible with one of an APPLE® computer bus format and a Universal Serial Bus (USB) computer bus format, or a mount attachment structure as disclosed herein, e.g., mount attachment structure 1170-1, 1170-2, etc.), and having an exposed third electrode set corresponding to the second set, respectively; and one or more leads, contained in at least one of the walls, that electrically connect the second electrode set to the third electrode set, respectively.

For such a case, the first connector can have a female configuration, and the second connector can have a corresponding male configuration. For such a cased, the first connector can be a socket, and the second connector can be a plug. For such a case, the third connector can be configured to provide rotary mechanical and electrical connections to the fourth connector. For such a case, the second connector can be formed into the surface of the recess, and the third connector can be formed into the exterior surface of the one or more walls. For such a case, at least a first material forms a part of the at least one wall containing the one or more leads, and the one or more leads are embedded in the first material.

The present invention is not limited to the particular embodiments illustrated in the drawings and described above in detail. Those skilled in the art will recognize that other arrangements could be devised, for example, Examples. The present invention encompasses every possible combination of the various features of each embodiment disclosed. One or more of the elements described herein with respect to various embodiments can be implemented in a more separated or integrated manner than explicitly described, or even removed or rendered as inoperable in certain cases, as is useful in accordance with a particular application While the present invention has been described with reference to specific illustrative embodiments, modifications and variations of the present invention may be constructed without departing from the spirit and scope of the present invention as set forth in the following claims.

What is claimed is:

1. A coupling arrangement comprising:
   a projection; and
   a corresponding receptacle;
   wherein:
      a proximal end of the projection has a flange; and
      the projection includes an integral exposed first set of electrodes,
         at least a first one thereof being formed in an exposed location on the flange, and
         at least a second one thereof being formed in an exposed location on a distal end of the projection;
   wherein:
      the receptacle includes walls that define a recess having sides and a bottom, the recess being configured to removably receive the projection;
      one or more of the walls provides one or more bearing surfaces outside the recess configured to support the flange; and
      the receptacle includes an integral second electrode set corresponding to the first set, respectively,
         at least a first one thereof being formed in at least one exposed location on one or more of the bearing surfaces, and
         at least a second one thereof being formed in an exposed location at the bottom of the recess; and
   wherein the projection and the recess are correspondingly sized so that the second electrode at the distal end of the projection is disposed in contact with the second electrode at the bottom of the recess when the first electrode at the flange is disposed in contact with the first electrode at the one or more bearing surfaces,
   wherein:
      the projection is extendable from one of a case for a mobile device and a corresponding mount for the case; and
      the receptacle is provided in the other of the case and the mount, respectively.

2. The coupling arrangement of claim 1, wherein:
   the mount is a mobile structure;
   the mount further includes at least one of the following:
      a battery from which power is transferable to the mobile device via at least two corresponding electrodes of the first electrode set and the second electrode set, respectively; and one or more of a magnetic card reader, a smartcard reader, an external storage device, an antenna, a lens system and a sensor from which signals are transferable to the mobile device via at least two corresponding electrodes of the first electrode set and the second electrode set, respectively.

3. The coupling arrangement of claim 1, wherein:
the projection includes at least a first magnet; and
the recess includes at least a second magnet; and
the at least first and second magnets attract each other and thereby draw the projection into the recess.

4. The coupling arrangement of claim 3, wherein:
one of at least the first and second magnets is an electromagnet; and
the coupling arrangement further comprises:
   a battery; and
   a switch connecting the battery to the electromagnet, the switch being operable to selectively de-energize the electromagnet.

5. The coupling arrangement of claim 3, wherein:
the projection includes at least a third magnet; and
the recess includes at least a fourth magnet; and
the at least first and third magnets of the projection and the at least second and fourth magnets of the recess are arranged so that fields thereof cooperatively interact as magnetic detents relative to orientations of the projection relative to the recess.

6. The coupling arrangement of claim 1, wherein:
the flange at the proximal end of the projection is a first-type flange;
the receptacle further includes:
   one or more second-type flanges that extend from one or more of the walls defining the sides of the recess so as to form a mouth of the recess which is narrower than the bottom of the recess;
the projection includes third-type flanges that are radially displaceable relative to a long axis of the projection,
   the third-type flanges being radially retractable to permit insertion of the projection into the recess,
   the third-type flanges being radially extendable when the projection is inserted into the recess so as to engage the one or more second-type flanges and thereby resist withdrawal of the projection from the recess.

7. A coupling arrangement comprising:
a first mating part including:
   a first base;
   a projection extending from the first base; and
   annular groove segments formed in the base adjacent to the projection;
a second mating part including:
   a second base into which is formed a receptacle including walls that define a recess having sides and a bottom, the recess being configured to removably receive the projection; and
   tabs, located adjacent to the recess and extending from the second base, and configured to removably engage the annular groove segments;
wherein:
   a distal end of the projection includes an integral exposed first set of electrodes;
   the bottom of the receptacle includes an integral second electrode set corresponding to the first set, respectively; and
   the projection and the recess are correspondingly sized so that the first and second electrode sets are disposed in contact, respectively, when the distal end of the projection abuts the bottom of the recess.

8. The coupling arrangement of claim 7, wherein:
the projection is extendable from one of a case for a mobile device and a corresponding mount for the case; and
the receptacle is provided in the other of the case and the mount, respectively.

9. The coupling arrangement of claim 7, wherein:
the mount is a mobile structure;
the mount further includes at least one of the following:
   a battery from which power is transferable to the mobile device via at least two corresponding electrodes of the first electrode set and the second electrode set, respectively; and
   one or more of a magnetic card reader, a smartcard reader, an external storage device, an antenna, a lens system and a sensor from which signals are transferable to the mobile device via at least two corresponding electrodes of the first electrode set and the second electrode set, respectively.

10. The coupling arrangement of claim 7, wherein:
each tab includes a flange that extends towards a central region of the recess;
each annular segment includes an annular alcove that extends toward a central region of the projection; and
the tabs are further configured to be selectively radially displaceable with respect to the central region of the recess so as to permit the flanges to removably engage the alcoves.

11. The coupling arrangement of claim 7, wherein:
the projection includes at least a first magnet; and
the recess includes at least a second magnet; and
the at least first and second magnets attract each other and thereby draw the projection into the recess.

12. The coupling arrangement of claim 11, wherein:
one of at least the first and second magnets is an electromagnet; and
the coupling arrangement further comprises:
   a battery; and
   a switch connecting the battery to the electromagnet, the switch being operable to selectively de-energize the electromagnet.

13. The coupling arrangement of claim 11, wherein:
the projection includes at least a third magnet; and
the recess includes at least a fourth magnet; and
the at least first and third magnets of the projection and the at least second and fourth magnets of the recess are arranged so that fields thereof cooperatively interact as magnetic detents relative to orientations of the projection relative to the recess.

* * * * *